(12) United States Patent
Sugasaki

(10) Patent No.: US 7,790,348 B2
(45) Date of Patent: *Sep. 7, 2010

(54) DECOMPOSABLE RESIN COMPOSITION AND FLEXOGRAPHIC PRINTING PLATE PRECURSOR USING THE SAME

(75) Inventor: Atsushi Sugasaki, Haibara-gun (JP)

(73) Assignee: FUJIFILM Corporation, Tokyo (JP)

( * ) Notice: Subject to any disclaimer, the term of this patent is extended or adjusted under 35 U.S.C. 154(b) by 44 days.

This patent is subject to a terminal disclaimer.

(21) Appl. No.: 11/723,651

(22) Filed: Mar. 21, 2007

(65) Prior Publication Data

US 2007/0231737 A1 Oct. 4, 2007

(30) Foreign Application Priority Data

Mar. 31, 2006 (JP) ............................. 2006-099778

(51) Int. Cl.
- *C08G 59/68* (2006.01)
- *G03F 7/00* (2006.01)
- *G03F 7/26* (2006.01)

(52) U.S. Cl. .................... 430/270.1; 430/281.1; 522/29

(58) Field of Classification Search .................. 428/67, 428/195; 430/270.1, 286.1, 281; 526/171
See application file for complete search history.

(56) References Cited

U.S. PATENT DOCUMENTS 5,514,728 A * 5/1996 Lamanna et al. .............. 522/31

2002/0098439 A1 7/2002 Kubo et al.
2007/0037940 A1 * 2/2007 Lazzari et al. ............... 526/171

FOREIGN PATENT DOCUMENTS

| EP | 1215044 A2 * | 6/2002 |
|---|---|---|
| JP | 08-258442 A | 10/1996 |
| JP | 10-119436 A | 5/1998 |
| JP | 10-244751 A | 9/1998 |
| JP | 11-170718 A | 6/1999 |
| JP | 2002-244289 A | 8/2002 |
| JP | 2005-510383 A | 4/2005 |
| JP | 2005-221655 A | 8/2005 |
| WO | WO 98/30557 A1 | 7/1998 |

OTHER PUBLICATIONS

Craig, Stuart W. and Coughlin, E. B. Acyclic Diene Metathesis (ADMET) Depolymerization of Elastomers using Ruthenium Catalyst. Polymer Preprints, 200, 42(2) University of Massachusetts, Amherst pp. 589-590.*

Craig, Stuart W. and Coughlin, E. B. Acyclic Diene Metathesis (ADMET) Depolymerization of Elastomers using Ruthenium Catalyst, Polymer Preprints, 200, 42 (2) University of Massachusettsm Anherst pp. 589-590.*

XP-008080967—(2001) Craig et al., "Acyclic Diene Metathesis (ADMET) Depolymerization of Elastomers Using Ruthenium Catalysts", vol. 45, No. 2, pp. 589-590.

European Search Report dated Jul. 27, 2007.

* cited by examiner

*Primary Examiner*—Cynthia H Kelly
*Assistant Examiner*—Chanceity N Robinson
(74) *Attorney, Agent, or Firm*—Sughrue Mion, PLLC

(57) ABSTRACT

A decomposable resin composition containing a metathesis catalyst and a polymer compound.

6 Claims, No Drawings

DECOMPOSABLE RESIN COMPOSITION AND FLEXOGRAPHIC PRINTING PLATE PRECURSOR USING THE SAME

FIELD OF THE INVENTION

The present invention relates to a decomposable resin composition, more particularly to a composition satisfying both a high decomposability and a good preservation stability which is capable of forming a pattern easily upon stimulation, for example, with heat or light, in particular, which is capable of being engraved by a laser directly or a laser followed by a simple treatment, a pattern-forming material using the same, and a flexographic printing plate precursor using the same.

BACKGROUND OF THE INVENTION

Decomposable resins and decomposable resin compositions means resins decomposable in response to an external factor, for example, a thermal factor, a mechanical factor, a photochemical factor, a radiation-chemical factor or a factor with a chemical agent and are well known. Change in form (liquefaction or vaporization) or change in nature or property, for example, molecular weight, hardness, viscoelasticity, glass transition point (Tg), solubility or adhesiveness, which is caused by the decomposition of resin, is utilized in various fields.

Examples of the decomposable resin and decomposable resin composition include a biodegradable plastic (for example, polylactic acid) for decreasing environmental impact of plastic material and a slow releasing material which can gradually release a component, for example, medical agent or fragrance in the field of healthcare, cosmetic or life science. However, they gradually decompose by oxygen, light or enzyme in a natural environment, within the living body, in the soil or the like and thus they do not stably maintain their initial states and can not induce at once a large change in the nature upon the external stimulation.

Resins which are decomposed by light or heat for improvement in the recycling efficiency or simplification of the disposal and adhesives which decrease the adhesiveness thereof are also developed. Further, it is known that ceramic or carbon fiber is mixed with a decomposable resin and then the decomposable resin is removed, for example, by calcination to form a porous material. However, in these cases, the materials are altogether treated or processed and it is not intended to form the desired pattern only in the desired portion. Also, large energy is required for the decomposition treatment.

With respect to the application to image formation, for instance, it is known that both preservation stability and image fixability of toner are achieved by utilizing change in the nature due to heat at the heat-fixing of the toner containing a heat-decomposable resin. However, the resin per se does not have sufficient response to the pattern-wise stimulation.

As for pattern-forming materials, on the other hand, for example, a so-called chemically-amplified resist is well known as a photoresist. Specifically, a composition containing an acid generator and an acid-decomposable resin is pattern-wise exposed to light followed by heat treatment, if desired, to decompose pattern-wise the resin and the pattern is formed with development processing. Although the composition satisfies both the preservation stability and the pattern-forming property at a practical level, the development process in which the processing conditions are fully controlled is indispensable for the formation of pattern. Further, the pattern-formation in a thick layer having, for example, several tens of micrometers or more is difficult, though it is possible to apply to a thin layer.

A method of forming an image utilizing a step of removing (ablation) a part of thin layer by imagewise irradiation of laser beam is also known (JP-A-10-119436 (the term "JP-A" as used herein means an "unexamined published Japanese patent application")). However, the compounds recited as the heat-decomposable resin are only conventional general-purpose resins, for example, polyesters, polycarbonates or polyurethanes, and the thickness of the layer is only around 1 to 2 µm. It is also known to use a compound defined its heat-decomposing property (JP-A-10-244751 (corresponding to US 2002/0098439 A1) ). However, the thickness of the layer described therein is only around 1 to 2 µm.

As a mask material for paste printing to a printed circuit board, a mask for forming a pattern having approximately 100 to 200 µm utilizing a photo-decomposable resin sheet and a production method of the mask are described (JP-A-8-258442). However, a specific compound does not disclosed in the patent. Also, the controlled development processing is indispensable in order to form the pattern while regulating the degree of development.

On the other hand, in order to form a pattern in a thick layer by a simple process, for example, pattern-formation by laser processing is known, in which the base material per se is removed, deformed or discolored by imagewise irradiation of laser beam. For instance, a method of recording information, for example, a lot number on a product (for example, video tape or home electric appliances) composed of a variety of base materials is utilized as a laser maker. In such cases, conventional resins are used as they are as the base material.

Laser engraving type flexographic printing plates by applying more actively the above-described technique to the formation of concavo-convex pattern in a thick layer are known (JP-A-11-170718, JP-A-2002-244289 (corresponding to EP1215044A2), JP-A-2005-221655 and JP-T-2005-510383 (the term "JP-T" as used herein means a "published Japanese translation of a PCT patent application")).

The flexographic printing plate is a kind of letterpress printing plate and is prepared by forming a convex pattern on a printing plate precursor composed of a rubber plate, a resin plate or the like. Ordinarily, a thickness of the rubber plate or resin plate is approximately from one to several mm and it is also desired that a thickness of the concavo-convex pattern is approximately from 0.1 to 2 or 3 mm. Heretofore, a photosensitive resin composition is subjected to pattern exposure and development to form an image. However, in response to the advance of digitalization in the world, techniques in which data processed in a computer are directly utilized for the preparation of a flexographic printing plate are developed. Among them, a technique in which a flexographic printing plate precursor is irradiated with laser to directly remove the non-image area thereby forming a convex pattern is called as the laser engraving type flexographic printing plate.

However, in these cases, a high power carbon dioxide gas laser of 100 W or more is used as the laser in the process for engraving a layer and a conventional rubber or elastomer (for example, SBR) per se is used as the resin layer. Thus, an extremely long time is required for the engraving.

A decomposable resin which has sufficient response to stimulation as the decomposable resin, which forms a pattern only with a simple treatment, and particularly, which is applicable to a thick layer, has not yet been known.

SUMMARY OF THE INVENTION

An object of the present invention is to provide a decomposable resin composition which can form a pattern with a simple treatment and is applicable to a thick layer, and a flexographic printing plate precursor which has high engraving sensitivity and is capable of being efficiently engraved with low laser energy.

As a result of the extensive investigations, the inventor has found that by coexisting a polymer compound with a metathesis catalyst, the polymer compound which is ordinarily not decomposed easily with heating or laser exposure can be easily decomposed by the function of the metathesis catalyst and by means of the feature, a pattern formation with a laser exposure can be easily performed in comparison with a heretofore known method.

Specifically, the above-described object can be achieved by the following constitution.

(1) A decomposable resin composition comprising (A) a metathesis catalyst and (B) a polymer compound.
(2) The decomposable resin composition as described in (1) above, which is laser-decomposable.
(3) The decomposable resin composition as described in (1) or (2) above, wherein the polymer compound (B) has a carbon-carbon unsaturated bond in at least one of a main chain and a side chain thereof.
(4) A pattern-forming material comprising the decomposable resin composition as described in any one of (1) to (3) above.
(5) A flexographic printing plate precursor comprising a support and the decomposable resin composition as described in any one of (1) to (3) above.
(6) The flexographic printing plate precursor as described in (5) above, which is a laser engraving type.
(7) The flexographic printing plate precursor as described in (6) above, wherein a laser for engraving is a YAG laser, a fiber laser, a carbon dioxide gas laser or a semiconductor laser.

each represents an organic functional group or a halogen atom) shown below and is includes those typified by compounds described in literature: R. H. Grubbs, *Handbook of Metathesis*, Vols. 1 to 3, WILEY-VCH Verlag GmbH & Co. KgaA, Weinheim (2003).

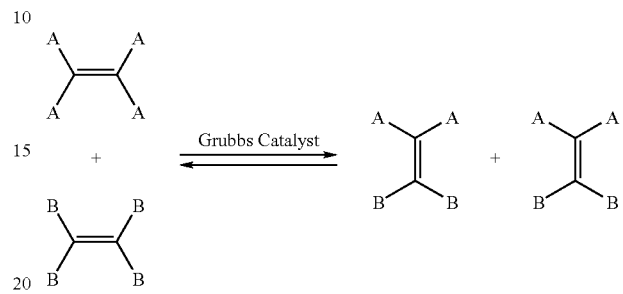

The functional mechanism of the metathesis catalyst according to the invention is not quite clear but is presumed as follows.

For instance, taking a case (shown below) where a polymer such as polybutadiene is decomposed with the metathesis catalyst as an example, the metathesis catalyst (represented by M shown below) is first introduced into the polymer main chain to form a configuration in which the metathesis catalyst is added to the polymer main chain as shown in (A) below. Then, the polymer reacts with another polymer molecule as shown in (B) below to cause decomposition of the polymer main chain according to the metathesis reaction as shown in (C) below. It is presumed that the decomposition of the polymer main chain (in other words, the decomposition of the composition) is caused according to such a mechanism.

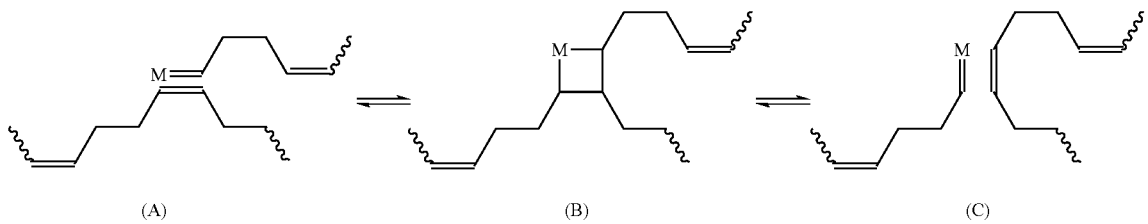

(A)　　　　　　　　　　(B)　　　　　　　　　　(C)

According to the decomposable resin composition of the present invention, a flexographic printing plate precursor which is engraved deeply and is capable of being engraved with low laser energy can be provided.

DETAILED DESCRIPTION OF THE INVENTION

[1] Metathesis Catalyst

The metathesis catalyst for use in the invention may be any compound which can catalyze the reaction (wherein A and B As the metathesis catalyst capable of being used in the invention, compounds described in literature: R. H. Grubbs, *Handbook of Metathesis*, Vols. 1 to 3, WILEY-VCH Verlag GmbH & Co. KgaA, Weinheim (2003) are typically illustrated and they can be synthesized based on the description of the literature. The metathesis catalyst for use in the invention should not be construed as being limited to those described in the literature.

From the standpoint of high catalytic ability of the metathesis catalyst, it is preferable that the metathesis catalyst has the structure represented by the following formula (1):

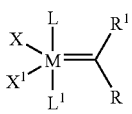
(1)

In formula (1), M represents a member selected from the group consisting of Os and Ru; R and $R^1$ each independently represents a member selected from the group consisting of a hydrogen atom, an unsubstituted or substituted alkyl group with one or more of an aryl group, a halogen atom, a hydroxy group, an alkoxy group having from 1 to 20 carbon atoms and an alkoxycarbonyl group having from 2 to 20 carbon atoms and an unsubstituted or substituted aryl group with one or more of an alkyl group having from 1 to 20 carbon atoms, an aryl group, a hydroxy group, an alkoxy group having from 1 to 5 carbon atoms, an amino group, a nitro group and a halogen atom; X and $X^1$ each independently represents an anionic ligand; and L and $L^1$ each independently represents a neutral electron donor.

In view of stability in the air and heat resistance in addition to the high catalytic ability, the following (A) to (D) are more preferable.

(A) A case wherein the substituted alkyl group for R or $R^1$ is an alkyl group substituted with one or more functional groups selected from the group consisting of an aryl group, an alcohol group, a thiol group, a ketone group, ah aldehyde group, an ester group, an ether group, an amine group, an imine group, an amido group, a nitro group, a carboxylic acid group, a disulfido group, a carbonate group, an isocyanate group, a carbodiimido group, a carboalkoxy group and a halogen atom.

(B) A case wherein the substituted aryl group for R or $R^1$ is an aryl group substituted with one or more functional groups selected from the group consisting of an alkyl group, an aryl group, an alcohol group, a thiol group, a ketone group, ah aldehyde group, an ester group, an ether group, an amine group, an imine group, an amido group, a nitro group, a carboxylic acid group, a disulfido group, a carbonate group, an isocyanate group, a carbodiimido group, a carboalkoxy group and a halogen atom.

(C) A case wherein R is selected from the group consisting of (a) a hydrogen atom, (b) an alkyl group having from 1 to 20 carbon atoms, (c) an aryl group, (d) an alkyl group having from 1 to 20 carbon atoms substituted with one or more groups selected from the group consisting of an aryl group, a halogen atom, a hydroxy group, an alkoxy group having from 1 to 20 carbon atoms and an alkoxycarbonyl group having from 2 to 20 carbon atoms, and (e) aryl group substituted with one or more functional groups selected from the group consisting of an alkyl group having from 1 to 20 carbon atoms, an aryl group, a hydroxy group, an alkoxy group having from 1 to 5 carbon atoms, an amino group, a nitro group and a halogen atom.

(D) A case wherein the neutral electron donor for L or $L^1$ is a functional group selected from the group consisting of a phosphine group, a sulfonated phosphine group, a phosphite group, a phosphinite group, phosphonite group, an arsine group, a stibine group, an ether group, an amine group, an amido group, a sulfoxydo group, a carboxyl group, a nitrosyl group, a pyridine group and a thioether group.

In a particularly preferable case, L and $L^1$ each independently represents a functional group selected from the group consisting of —P(cyclohexyl)$_3$, —P(cyclopentyl)$_3$ and —P(isopropyl)$_3$.

In the decomposable resin composition according to the invention, the decomposition is initiated by heating, for example, based on laser irradiation to form a depolymerization product.

The decomposition reaction may be performed in the presence of an aqueous solvent, a protonic solvent, an organic solvent or a mixture thereof in the resin composition or the decomposition reaction may be performed in the absence of the solvent. The decomposition reaction of the laser decomposable resin composition according to the invention may also be conducted in a gas phase or liquid phase.

The amount of the metathesis catalyst added to the decomposable resin composition according to the invention is preferably from 0.0001 to 20% by weight, more preferably from 0.0005 to 1% by weight, based on the polymer compound to be decomposed contained in the resin composition.

Specific preferable examples of the metathesis catalyst for use in the invention are set forth below, but the invention should not be construed as being limited thereto.

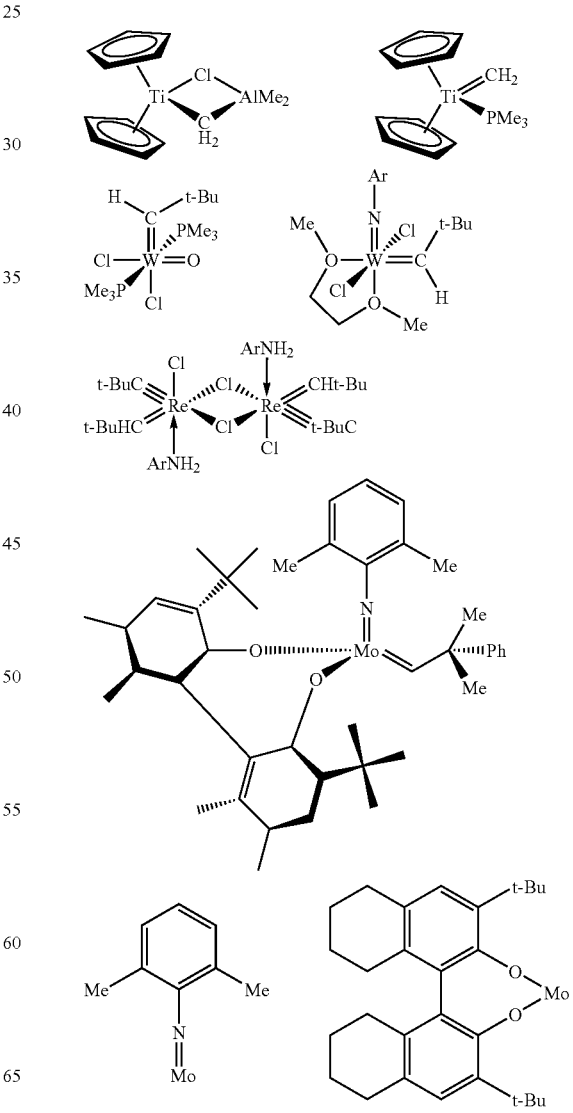

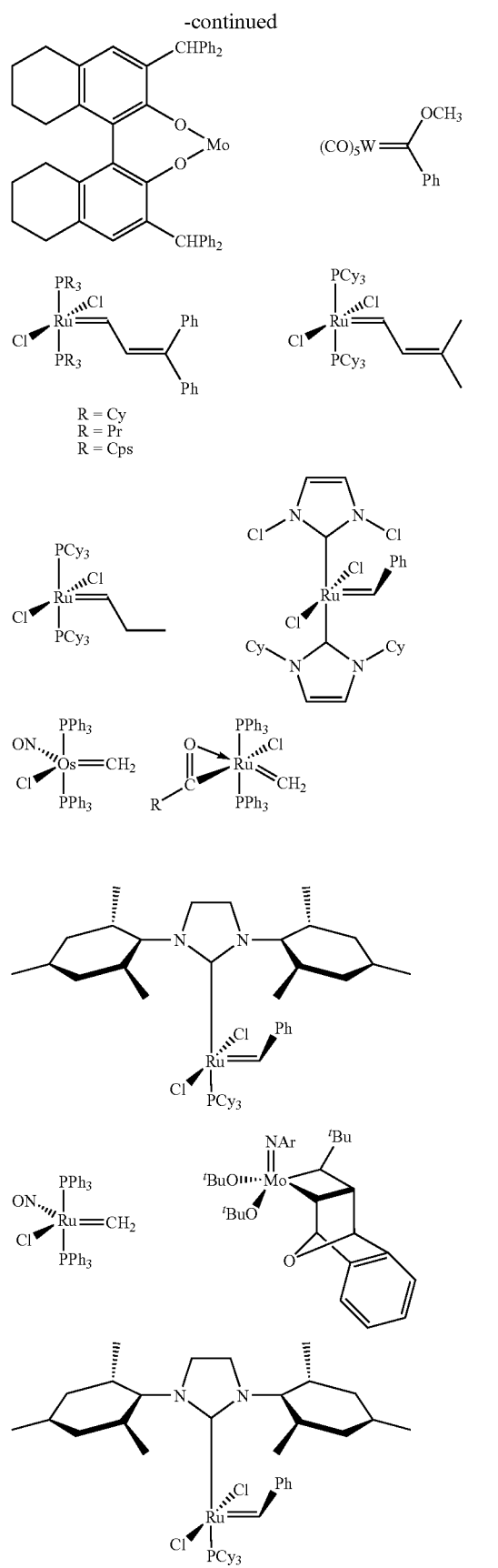
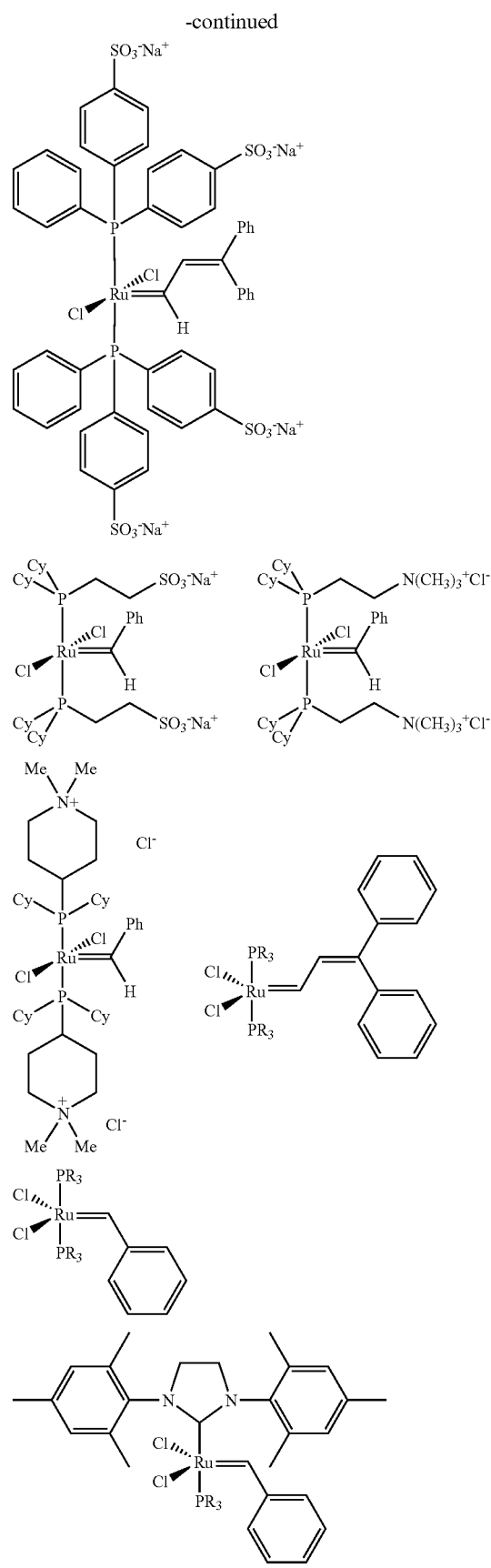

-continued
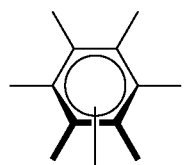
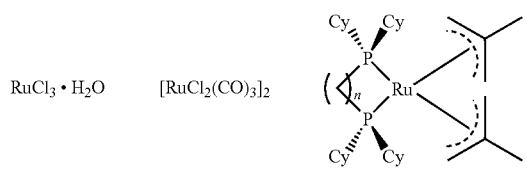
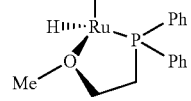
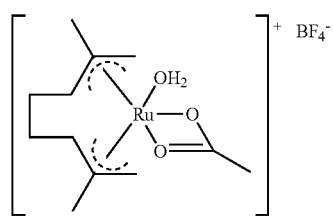
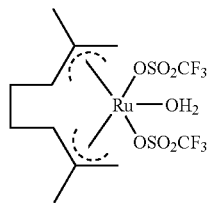
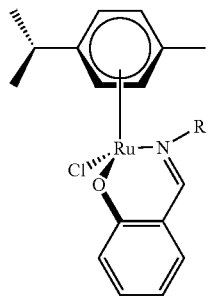
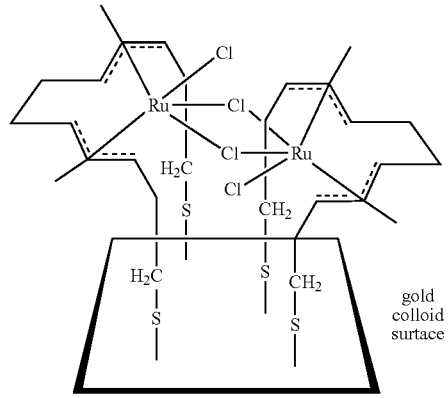
gold colloid surface
-continued
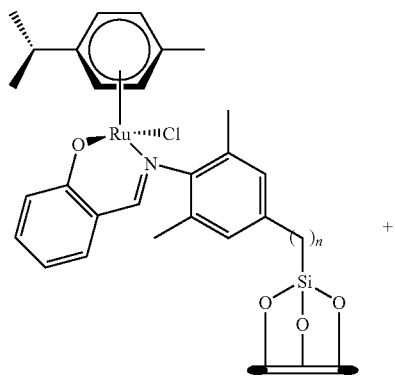
MCM-41
mesoporous matrix
trimethylsildiazomethane
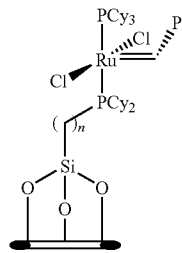
MCM-41
mesoporous matrix
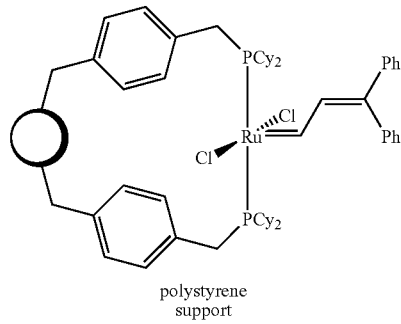
polystyrene support
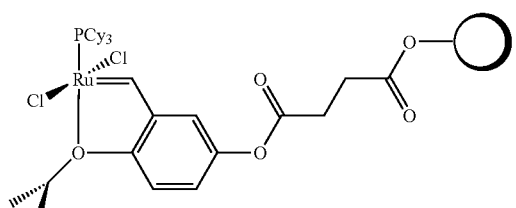
PEG support
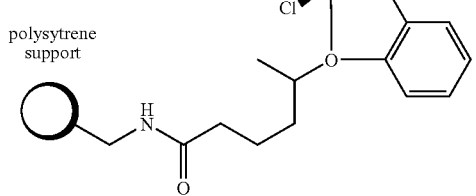
polysytrene support

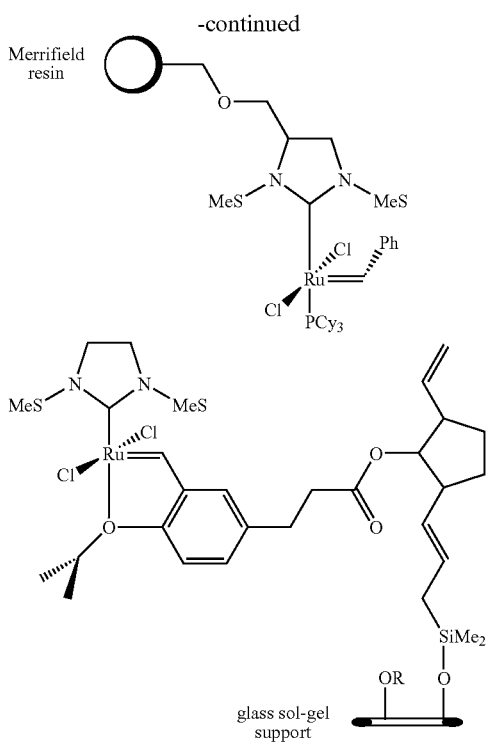

[2] Polymer Compound

The polymer compound (polymer compound which is decomposed with the metathesis catalyst) contained in the decomposable resin composition of the invention is preferably a polymer compound (especially a polymer) having a carbon-carbon unsaturated bond in any one of the main chain and side chain thereof. A polymer containing any one of an olefin (carbon-carbon double bond) and carbon-carbon triple bond in the main chain thereof is more preferable since the polymer exhibits the remarkable decomposition effect, and the polymer containing the olefin in the main chain thereof is particularly preferable in view of the high degradation rate of polymer.

Because of the high decomposition efficiency with the metathesis catalyst, the polymer containing any one of an olefin and carbon-carbon triple bond in the main chain thereof, for example, SB (polystyrene-polybutadiene), SBS (polystyrene-polybutadiene-polystyrene), SIS (polystyrene-polyisoprene-polystyrene) or SEBS (polystyrene-polyethylene/polybutylene-polystyrene) is preferably used in combination with the metathesis catalyst according to the invention.

The number average molecular weight of the polymer compound which used in combination with the metathesis catalyst is preferably in a range of 1,000 to 1,000,000, more preferably in a range of 5,000 to 500,000. When the number average molecular weight thereof is in the range of 1,000 to 1,000,000, mechanical strength of the printing plate precursor, that is, printing durability is ensured and the resin can be sufficiently molten or decomposed at the laser engraving. The term "number average molecular weigh" as used herein means a molecular weight obtained by measuring using gel permeation chromatography (GPC) and calculating in terms of standard polystyrene of a known molecular weight.

The amount of the polymer compound added which is decomposed with the metathesis catalyst contained in the decomposable resin composition of the invention is ordinarily from 1 to 99% by weight, preferably from 5 to 80% by weight, based on the total solid content of the resin composition.

(Resin Used Together)

According to the invention, it is also possible to use a conventional resin described below together with the above-described polymer compound.

The amount of the resin added is ordinarily from 1 to 90% by weight, preferably from 5 to 80% by weight, based on the polymer compound which is decomposed with the metathesis catalyst.

The resin may be an elastomer or a non-elastomer. The number average molecular weight of the resin (d) for use in the invention is preferably in a range of 1,000 to 1,000,000, more preferably in a range of 5,000 to 500,000. When the number average molecular weight thereof is in the range of 1,000 to 1,000,000, mechanical strength of the printing plate precursor, that is, printing durability is ensured and the resin can be sufficiently molten or decomposed at the laser engraving. The term "number average molecular weigh" as used herein means a molecular weight obtained by measuring using gel permeation chromatography (GPC) and calculating in terms of standard polystyrene of a known molecular weight.

As the resin, a resin easily liquefiable or a resin easily decomposable is preferable. The resin easily decomposable preferably contains in the molecular chain as a monomer unit easily decomposable, for example, a monomer unit derived from styrene, α-methylstyrene, α-methoxystyrene, an acryl ester, a methacryl ester, an ester compound, an ether compound, a nitro compound, a carbonate compound, a carbamoyl compound, a hemiacetal ester compound, an oxyethylene compound or an aliphatic cyclic compound. In particular, a polyether, for example, polyethylene glycol, polypropylene glycol or polytetraethylene glycol, an aliphatic polycarbonate, an aliphatic polycarbamate, polymethyl methacrylate, polystyrene, nitrocellulose, polyoxyethylene, polynorbornene, hydrogenated polycyclohexadiene or a polymer having a molecular structure of many branched structures, for example, a dendrimer is the representative example of the resin easily decomposable. Also, a polymer containing a lot of oxygen atoms in the molecular chain is preferable from the standpoint of the decomposability. Among them, the compound having a carbonate group, a carbamate group or a methacryl group in the polymer main chain is preferable in view of the high thermal decomposability. For instance, a polyester or polyurethane synthesized using as the raw material, (poly)carbonatediol or (poly)carbonate dicarboxylic acid or a polyamide synthesized using as the raw material, (poly)carbonate diamine is illustrated as a preferable example of the polymer of good thermal decomposability. The polymer may contain a polymerizable unsaturated group in the main chain or side chain thereof. In particular, when the polymer has a reactive functional group, for example, a hydroxy group, an amino group or a carboxyl group at the terminal, it is easy to introduce the polymerizable unsaturated group into the terminal of the main chain.

The thermoplastic elastomer is not particularly restricted and includes, for example, a urethane-series thermoplastic elastomer, an ester-series thermoplastic elastomer, an amide-series thermoplastic elastomer or a silicone-series thermoplastic elastomer. In order to more increase the thermal decomposability, a polymer wherein an easily decomposable functional group, for example, a carbamoyl group or a carbonate group is introduced into the main chain can be used.

Also, it may be used as a mixture with a polymer of higher thermal decomposability. Since the thermoplastic elastomer is fluidized by heating, it is possible to mix with an inorganic porous body for use in the invention. The term "thermoplastic elastomer" as used herein means a material which exhibits rubber elasticity at ambient temperature and is fluidized by heating to undergo fabrication as an ordinary thermoplastic plastic. With respect to the molecular structure, the thermoplastic elastomer comprises a soft segment like a polyether or a rubber molecule and a hard segment which prevents plastic deformation around ambient temperature as vulcanized rubber. As the hard segment, various types, for example, a frozen phase, a crystalline phase, a hydrogen bond or an ionic crosslinkage are present.

The kind of thermoplastic elastomer can be selected depending on the use of the resin composition. For instance, in the field requiring solvent resistance, a urethane-series, ester-series, amide-series or fluorine-series thermoplastic elastomer is preferable and in the field requiring heat resistance, a urethane-series, olefin-series, ester-series or fluorine-series thermoplastic elastomer is preferable. Further, the hardness can be widely changed depending on the kind of thermoplastic elastomer. In the use of conventional printing plate, a thermoplastic elastomer having Shore A hardness ranging from 20 to 75 degrees is used. In the use of embossing for forming a surface concavo-convex pattern on paper, film or a building material, a relatively hard material is necessary and a thermoplastic elastomer having Shore D hardness ranging from 30 to 80 degrees is used.

The non-elastomeric thermoplastic resin is not particularly restricted and includes, for example, a polyester resin, an unsaturated polyester resin, a polyamide resin, a polyamide-imide resin, a polyurethane resin, an unsaturated polyurethane resin, a polysulfone resin, a polyethersulfone resin, a polyimide resin, a polycarbonate resin and a full aromatic polyester resin.

The resin used together may be a solvent-soluble resin. Specific examples thereof include a polysulfone resin, a polyethersulfone resin, an epoxy resin, an alkyd resin, a polyolefin resin and a polyester resin.

The resin used together does not ordinarily have a polymerizable unsaturated group having a high reactivity. However, it may have the polymerizable unsaturated group having a high reactivity at the terminal of the molecular chain or in the side chain. When a polymer having the polymerizable unsaturated group having a high reactivity, for example, a methacryloyl group is used, a printing plate precursor having the extremely high mechanical strength can be prepared. In particular, as for the polyurethane-series or polyester-series thermoplastic elastomer, the polymerizable unsaturated group having a high reactivity can be introduced into the molecule thereof with comparative ease. The terminology "be introduced into the molecule" as used herein means and includes cases wherein the polymerizable unsaturated group is directly bonded at both terminals or one terminal of the polymer main chain, at a terminal of the polymer side chain, or in the polymer main chain or side chain. Specifically, for instance, the resin having the polymerizable unsaturated group directly introduced at the terminal of molecule may be used. Alternatively, other method, for example, a method is preferably employed in which a component having a molecular weight of about several thousands and plural reactive groups, for example, a hydroxy group, an amino group, an epoxy group, a carboxyl group, an acid anhydride group, a ketone group, a hydrazine residue, an isocyanate group, an isothiocyanate group, a cyclic carbonate group or an ester group is reacted with a bonding agent (for example, a polyisocyanate group reacting with a hydroxy group or amino group) having a group capable of connecting with the reactive group of the above component to conduct the adjustment of molecular weight and conversion to a terminal bonding group and then the resulting compound is reacted with an organic compound having a group capable of reacting with the terminal bonding group and a polymerizable unsaturated group to introduce the polymerizable unsaturated group into the terminal.

According to the invention, the decomposable resin composition may contain a polymerizable compound (monomer), an initiator and other components, if desired, in addition to the metathesis catalyst and polymer compound described above. The polymerizable compound (monomer), initiator and other components will be described hereinafter.

[3] Polymerizable Compound

The polymerizable compound (monomer) is described in greater detail below taking an addition polymerizable compound as an example.

<Addition Polymerizable Compound>

The addition-polymerizable compound having at least one ethylenically unsaturated double bond which is the polymerizable compound preferably used in the invention is selected from compounds having at least one, preferably two or more, terminal ethylenically unsaturated double bonds. Such compounds are widely known in the field of art and they can be used in the invention without any particular limitation. The compound has a chemical form, for example, a monomer, a prepolymer, specifically, a dimer, a trimer or an oligomer, or a copolymer thereof, or a mixture thereof. Examples of the monomer and copolymer thereof include unsaturated carboxylic acids (for example, acrylic acid, methacrylic acid, itaconic acid, crotonic acid, isocrotonic acid or maleic acid) and esters or amides thereof. Preferably, esters of an unsaturated carboxylic acid with an aliphatic polyhydric alcohol compound and amides of an unsaturated carboxylic acid with an aliphatic polyvalent amine compound are used. An addition reaction product of an unsaturated carboxylic acid ester or amide having a nucleophilic substituent, for example, a hydroxy group, an amino group or a mercapto group, with a monofunctional or polyfunctional isocyanate or epoxy, or a dehydration condensation reaction product of the unsaturated carboxylic acid ester or amide with a monofunctional or polyfunctional carboxylic acid is also preferably used. Furthermore, an addition reaction product of an unsaturated carboxylic acid ester or amide having an electrophilic substituent, for example, an isocyanato group or an epoxy group with a monofunctional or polyfunctional alcohol, amine or thiol, or a substitution reaction product of an unsaturated carboxylic acid ester or amide having a releasable substituent, for example, a halogen atom or a tosyloxy group with a monofunctional or polyfunctional alcohol, amine or thiol is also preferably used. In addition, compounds in which the unsaturated carboxylic acid described above is replaced by an unsaturated phosphonic acid, styrene, vinyl ether or the like can also be used.

Specific examples of the monomer, which is an ester of an aliphatic polyhydric alcohol compound with an unsaturated carboxylic acid, include acrylic acid esters, for example, ethylene glycol diacrylate, triethylene glycol diacrylate, 1,3-butanediol diacrylate, tetramethylene glycol diacrylate, propylene glycol diacrylate, neopentyl glycol diacrylate, trimethylolpropane triacrylate, trimethylolpropane tri(acryloyloxypropyl)ether, trimethylolethane triacrylate, hexanediol diacrylate, 1,4-cyclohexanediol diacrylate, tetraethylene glycol diacrylate, pentaerythritol diacrylate, pentaerythritol triacrylate, pentaerythritol tetraacrylate, dipentaerythritol diacrylate, dipentaerythritol hexaacrylate, sorbitol triacrylate, sorbitol tetraacrylate, sorbitol pentaacrylate, sorbitol hexaacrylate, tri(acryloyloxyethyl)isocyanurate or polyester acrylate oligomer;

methacrylic acid esters, for example, tetramethylene glycol dimethacrylate, triethylene glycol dimethacrylate, neopentyl glycol dimethacrylate, trimethylolpropane trimethacrylate, trimethylolethane trimethacrylate, ethylene glycol dimethacrylate, 1,3-butanediol dimethacrylate, hexanediol dimethacrylate, pentaerythritol dimethacrylate, pentaerythritol trimethacrylate, pentaerythritol tetramethacrylate, dipentaerythritol dimethacrylate, dipentaerythritol hexamethacrylate, sorbitol trimethacrylate, sorbitol tetramethacrylate, bis[p-(3-methacryloxy-2-hydroxypropoxy)phenyl]dimethylmethane or bis[p-(methacryloxyethoxy)-phenyl]dimethylmethane;

itaconic acid esters, for example, ethylene glycol diitaconate, propylene glycol diitaconate, 1,3-butanediol diitaconate, 1,4-butanediol diitaconate, tetramethylene glycol diitaconate, pentaerythritol diitaconate or sorbitol tetraitaconate;

crotonic acid esters, for example, ethylene glycol dicrotonate, tetramethylene glycol dicrotonate, pentaerythritol dicrotonate or sorbitol tetradicrotonate;

isocrotonic acid esters, for example, ethylene glycol diisocrotonate, pentaerythritol diisocrotonate or sorbitol tetraisocrotonate; and maleic acid esters, for example, ethylene glycol dimaleate, triethylene glycol dimaleate, pentaerythritol dimaleate and sorbitol tetramaleate.

Other examples of the ester, which can be preferably used, include aliphatic alcohol esters described in JP-B-46-27926 (the term "JP-B" as used herein means an "examined Japanese patent publication") JP-B-51-47334 and JP-A-57-196231, esters having an aromatic skeleton described in JP-A-59-5240, JP-A-59-5241 and JP-A-2-226149, and esters containing an amino group described in JP-A-1-165613.

The above-described ester monomers can also be used as a mixture.

Specific examples of the monomer, which is an amide of an aliphatic polyvalent amine compound with an unsaturated carboxylic acid, include methylene bisacrylamide, methylene bismethacrylamide, 1,6-hexamethylene bisacrylamide, 1,6-hexamethylene bismethacrylamide, diethylenetriamine trisacrylamide, xylylene bisacrylamide and xylylene bismethacrylamide.

Other preferable examples of the amide monomer include amides having a cyclohexylene structure described in JP-B-54-21726.

Urethane type addition polymerizable compounds produced using an addition reaction between an isocyanate and a hydroxy group are also preferably used, and specific examples thereof include vinylurethane compounds having two or more polymerizable vinyl groups per molecule obtained by adding a vinyl monomer containing a hydroxy group represented by formula (V) shown below to a polyisocyanate compound having two or more isocyanate groups per molecule, described in JP-B-48-41708.

$$CH_2=C(R)COOCH_2CH(R')OH \quad (V)$$

wherein R and R' each independently represents H or $CH_3$.

Also, urethane acrylates described in JP-A-51-37193, JP-B-2-32293 and JP-B-2-16765, and urethane compounds having an ethylene oxide skeleton described in JP-B-58-49860, JP-B-56-17654, JP-B-62-39417 and JP-B-62-39418 are preferably used.

Furthermore, the resin composition having remarkably excellent photo-speed can be obtained by using an addition polymerizable compound having an amino structure or a sulfide structure in its molecule, described in JP-A-63-277653, JP-A-63-260909 and JP-A-1-105238.

Other examples include polyfunctional acrylates and methacrylates, for example, polyester acrylates and epoxy acrylates obtained by reacting an epoxy resin with acrylic acid or methacrylic acid, described in JP-A-48-64183, JP-B-49-43191 and JP-B-52-30490. Specific unsaturated compounds described in JP-B-46-43946, JP-B-1-40337 and JP-B-1-40336, and vinylphosphonic acid series compounds described in JP-A-2-25493 can also be exemplified. In some cases, structure containing a perfluoroalkyl group described in JP-A-61-22048 can be preferably used. Moreover, photocurable monomers or oligomers described in Nippon Secchaku Kyokaishi (Journal of Japan Adhesion Society) Vol. 20, No. 7, pages 300 to 308 (1984) can also be used.

In view of the photo-speed, a structure having a large content of unsaturated groups per molecule is preferred and in many cases, a difunctional or more functional compound is preferred. In order to increase the strength of image area, that is, hardened layer, a trifunctional or more functional compound is preferred. A combination use of compounds different in the functional number or in the kind of polymerizable group (for example, an acrylic acid ester, a methacrylic acid ester, a styrene compound or a vinyl ether compound) is an effective method for controlling both the sensitivity and the strength. The polymerizable compound is preferably used in an amount from 5 to 80% by weight, more preferably from 25 to 75% by weight, based on the nonvolatile component of the resin composition layer. The polymerizable compounds may be used individually or in combination of two or more thereof.

[4] Initiator

As the initiator, initiator compounds known to those skilled in the art can be used without limitation. Specifically, many compounds described in literature, for example, Bruce M. Monroe et al., Chemical Review, 93, 435 (1993), R. S. Davidson, Journal of Photochemistry and Biology A: Chemistry, 73, 81 (1993), J. P. Faussier, Photoinitiated Polymerization-Theory and Applications: Rapra Review, Vol. 9, Report, Rapra Technology (1998) or M. Tsunooka et al., Prog. Polym. Sci., 21, 1 (1996) can be used. Further, a group of compounds undergoing oxidative or reductive bond cleavage as described, for example, in F. D. Saeva, Topics in Current Chemistry, 156, 59 (1990), G. G. Maslak, Topics in Current Chemistry, 168, 1 (1993), H. B. Shuster et al., JACS, 112, 6329 (1990) and I. D. F. Eaton et al., JACS, 102, 3298 (1980) are known.

With respect to specific examples of preferable initiator compound, a radical initiator which is a compound that generates a radical upon light energy and/or heat energy and initiates or promotes a polymerization reaction of the above-described compound (monomer or polymerizable compound) having at least one ethylenically unsaturated bond is described in greater detail below, but the invention should not be construed as being limited thereto.

As the radical initiator preferably used in the invention, (a) an aromatic ketone, (b) an onium salt compound, (c) an organic peroxide, (d) a thio compound, (e) a hexaarylbiimidazole compound, (f) a ketoxime ester compound, (g) a borate compound, (h) an azinium compound, (i) a metallocene compound, (j) an active ester compound, (k) a compound having a carbon-halogen bond and (l) an azo series compound. Specific examples of the compounds of (a) to (l) are set forth below, but the invention should not be construed as being-limited thereto.

(a) Aromatic Ketone

The aromatic ketone (a) preferably used as the radical initiator in the invention includes compounds having a benzophenone skeleton or a thioxantone skeleton described in J. P. Fouassier and J. F. Rabek, *Radiation Curing in Polymer Science and Technology*, pages 77 to 117 (1993). For example, the following compounds are recited.

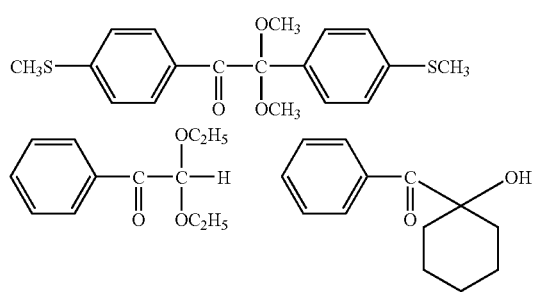

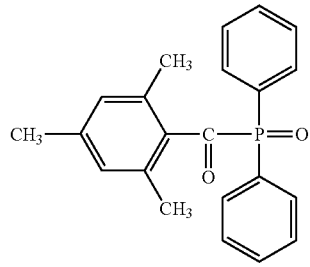

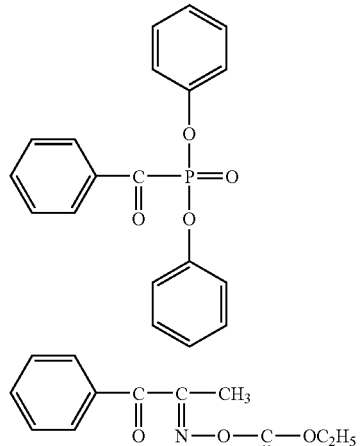

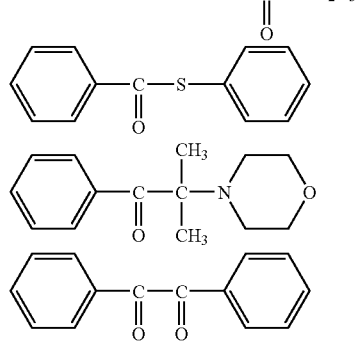

-continued

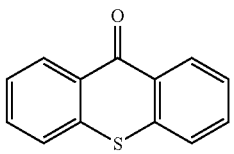

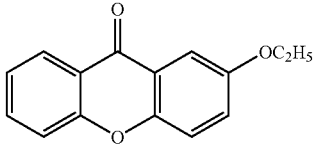

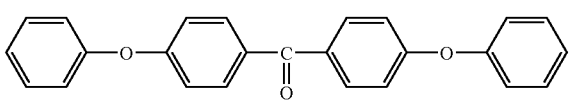

Among them, particularly preferable examples of the aromatic ketone (a) include the following compound:

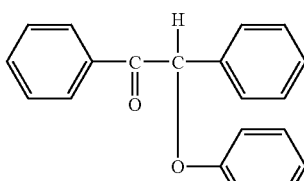

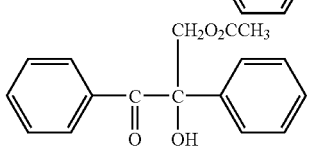

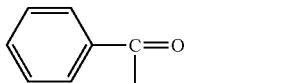

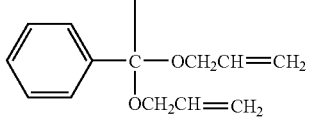

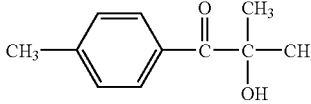

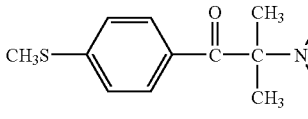

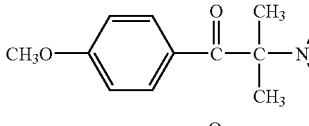

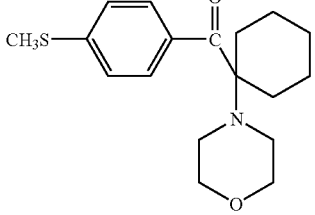

-continued

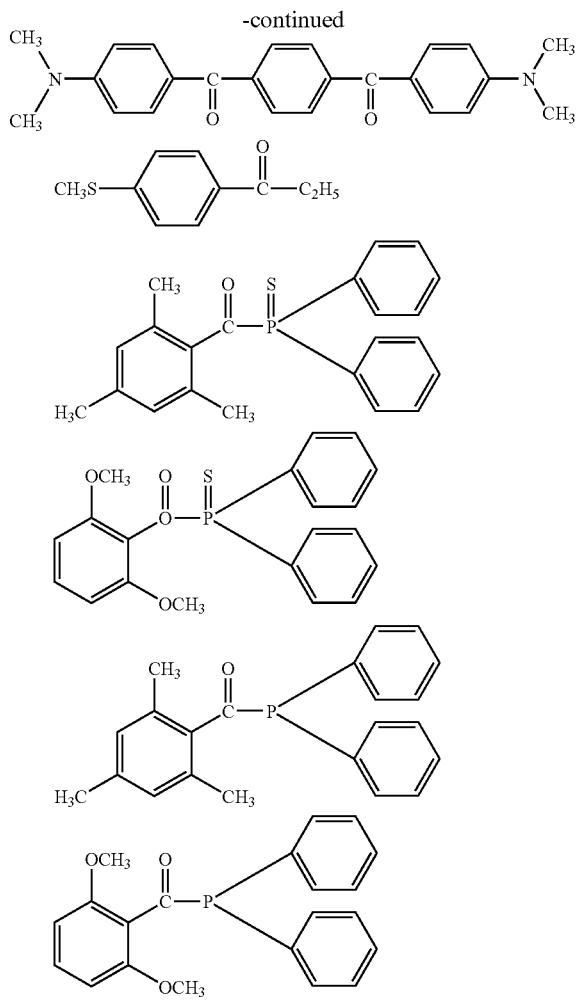

(b) Onium Salt Compound

The onium salt compound (b) preferably used as the radical initiator in the invention includes compounds represented by the following formulae (1) to (3):

$$Ar^1—I^+—Ar^2(Z^2)^-$$ Formula (1):

$$Ar^3—N^+\equiv N(Z^3)^-$$ Formula (2):

Formula (3):

$$\begin{array}{c} R^{23} \\ \diagdown \\ S^+—R^{25} \quad (Z^4)^- \\ \diagup \\ R^{24} \end{array}$$

In formula (1), $Ar^1$ and $Ar^2$ each independently represent an aryl group having not more than 20 carbon atoms, which may have a substituent. $(Z2)^-$ represents a counter ion selected from the group consisting of a halogen ion, a perchlorate ion, a carboxylate ion, tetrafluoroborate ion, a hexafluorophosphate ion and a sulfonate ion, and is preferably a perchlorate ion, a hexafluorophosphate ion and an arylsulfonate ion.

In formula (2), $Ar^3$ represents an aryl group having not more than 20 carbon atoms, which may have a substituent. $(Z^3)^-$ represents a counter ion having the same meaning as defined for $(Z^2)^-$.

In formula (3), $R^{23}$, $R^{24}$ and $R^{25}$, which may be the same or different, each represent a hydrocarbon group having not more than 20 carbon atoms, which may have a substituent. $(Z^4)^-$ represents a counter ion having the same meaning as defined for $(Z^2)^-$.

Specific examples of the onium salt preferably used in the invention include those described in Paragraph Nos. [0030] to [0033] of Japanese Patent Application No. 11-310623 and Paragraph Nos. [0015] to [0046] of Japanese Patent Application No. 2000-160323, and specific aromatic sulfonium salt compounds described in Japanese Patent Application Nos. 2000-266797, 2001-177150, 2000-160323, 2000-184603, 2000-310808, 2002-265467 and 2002-366539 both of which the applicant has been previously proposed.

(c) Organic Peroxide Compound

The organic peroxide compound (c) preferably used as the radical initiator in the invention includes almost all organic compounds having at least one oxygen-oxygen bond in the molecules thereof. Specific examples of the organic peroxide compound include methyl ethyl ketone peroxide, cyclohexanone peroxide, 3,3,5-trimethylcyclohexanone peroxide, methylcyclohexanone peroxide, acetylacetone peroxide, 1,1-bis(tert-butylperoxy)-3,3,5-trimethylcyclohexane, 1,1-bis(tert-butylperoxy)cyclohexane, 2,2-bis(tert-butylperoxy)butane, tert-butylhydroperoxide, cumene hydroperoxide, diisopropylbenzene hydroperoxide, paramethane hydroperoxide, 2,5-dimethylhexane-2,5-dihydroperoxide, 1,1,3,3-tetramethylbutyl hydroperoxide, di-tert-butyl peroxide, tert-butylcumyl peroxide, dicumyl peroxide, bis(tert-butylperoxyisopropyl)benzene, 2,5-dimethyl-2,5-di(tert-butylperoxy)hexane, 2,5-xanoyl peroxide, succinic peroxide, benzoyl peroxide, 2,4-dichlorobenzoyl peroxide, methatoluoyl peroxide, diisopropylperoxy dicarbonate, di-2-ethylhexylperoxy dicarbonate, di-2-ethoxyethylperoxy dicarbonate, dimethoxyisopropylperoxy dicarbonate, di(3-methyl-3-methoxybutyl)peroxy dicarbonate, tert-butylperoxy acetate, tert-butylperoxy pivalate, tert-butylperoxy neodecanoate, tert-butylperoxy octanoate, tert-butylperoxy 3,5,5-trimethylhexanoate, tert-butylperoxy laurate, tertiary carbonate, 3,3',4,4'-tetra(tert-butylperoxycarbonyl)benzophenone, 3,3',4,4'-tetra(tert-amylperoxycarbonyl)benzophenone, 3,3',4,4'-tetra(tert-hexylperoxycarbonyl)benzophenone, 3,3',4,4'-tetra(tert-octylperoxycarbonyl)benzophenone, 3,3',4,4'-tetra(cumylperoxycarbonyl)benzophenone, 3,3',4,4'-tetra(p-isopropylcumylperoxycarbonyl)benzophenone, carbonyl di(tert-butylperoxydihydrogen diphthalate) and carbonyl di(tert-hexylperoxydihydrogen diphthalate).

Among them, peroxy ester compounds, for example, 3,3',4,4'-tetra(tert-butylperoxycarbonyl)benzophenone, 3,3',4,4'-tetra(tert-amylperoxycarbonyl)benzophenone, 3,3',4,4'-tetra(tert-hexylperoxycarbonyl)benzophenone, 3,3',4,4'-tetra(tert-octylperoxycarbonyl)benzophenone, 3,3',4,4'-tetra(cumylperoxycarbonyl)benzophenone, 3,3',4,4'-tetra(p-isopropylcumylperoxycarbonyl)benzophenone and di-tert-butyldiperoxy isophthalate are preferred.

(d) Thio Compound

The thio compound (d) preferably used as the radical initiator in the invention includes compounds having the structure represented by the following formula (4):

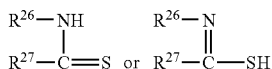

Formula (4)

In formula (4), $R^{26}$ represents an alkyl group, an aryl group or a substituted aryl group. $R^{27}$ represents a hydrogen atom or an alkyl group. Alternatively, $R^{26}$ and $R^{27}$ combine with each other and together represent a non-metallic atomic group necessary for forming a 5-membered, 6-membered or 7-membered ring, which may contain a hetero atom selected from an oxygen atom, a sulfur atom and a nitrogen atom.

Specific examples of the thio compound represented by formula (4) include the following compounds:

| No. | $R^{26}$ | $R^{27}$ |
|---|---|---|
| 1 | —H | —H |
| 2 | —H | —CH$_3$ |
| 3 | —CH$_3$ | —H |
| 4 | —CH$_3$ | —CH$_3$ |
| 5 | —C$_6$H$_5$ | —C$_2$H$_5$ |
| 6 | —C$_6$H$_5$ | —C$_4$H$_9$ |
| 7 | —C$_6$H$_4$Cl | —CH$_3$ |
| 8 | —C$_6$H$_4$Cl | —C$_4$H$_9$ |
| 9 | —C$_6$H$_4$—CH$_3$ | —C$_4$H$_9$ |
| 10 | —C$_6$H$_4$—OCH$_3$ | —CH$_3$ |
| 11 | —C$_6$H$_4$—OCH$_3$ | —C$_2$H$_5$ |
| 12 | —C$_6$H$_4$—OC$_2$H$_5$ | —CH$_3$ |
| 13 | —C$_6$H$_4$—OC$_2$H$_5$ | —C$_2$H$_5$ |
| 14 | —C$_6$H$_4$—OCH$_3$ | —C$_4$H$_9$ |
| 15 | —(CH$_2$)$_2$— | |
| 16 | —(CH$_2$)$_2$—S— | |
| 17 | —CH(CH$_3$)—CH$_2$—S— | |
| 18 | —CH$_2$—CH(CH$_3$)—S— | |
| 19 | —C(CH$_3$)$_2$—CH$_2$—S— | |
| 20 | —CH$_2$—C(CH$_3$)$_2$—S— | |
| 21 | —(CH$_2$)$_2$—O— | |
| 22 | —CH(CH$_3$)—CH$_2$—O— | |
| 23 | —C(CH$_3$)$_2$—CH$_2$—O— | |
| 24 | —CH=CH—N(CH$_3$)— | |
| 25 | —(CH$_2$)$_3$—S— | |
| 26 | —(CH$_2$)$_2$—CH(CH$_3$)—S— | |
| 27 | —(CH$_2$)$_3$—O— | |
| 28 | —(CH$_2$)$_5$— | |
| 29 | —C$_6$H$_4$—O— | |
| 30 | —N=C(SCH$_3$)—S— | |
| 31 | —C$_6$H$_4$—NH— | |
| 32 | 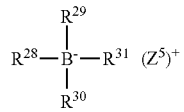 | |

(e) Hexaarylbiimidazole Compound

The hexaarylbiimidazole compound (e) preferably used as the radical initiator in the invention includes lophine dimers described in JP-B-45-37377 and JP-B-44-86516, specifically, for example, 2,2'-bis(o-chlorophenyl)-4,4',5,5'-tetraphenylbiimidazole, 2,2'-bis(o-bromophenyl)-4,4',5,5'-tetraphenylbiimidazole, 2,2'-bis(o,p-dichlorophenyl)-4,4',5,5'-tetraphenylbiimidazole, 2,2'-bis(o-chlorophenyl)-4,4',5,5'-tetra(m-methoxyphenyl)biimidazole, 2,2'-bis(o,o'-dichlorophenyl)-4,4',5,5'-tetraphenylbiimidazole, 2,2'-bis(o-nitrophenyl)-4,4',5,5'-tetraphenylbiimidazole, 2,2'-bis(o-methylphenyl)-4,4',5,5'-tetraphenylbiimidazole and 2,2'-bis(o-trifluoromethylphenyl)-4,4',5,5'-tetraphenylbiimidazole.

(f) Ketoxime Ester Compound

The ketoxime ester compound (f) preferably used as the radical initiator in the invention includes, for example, 3-benzoyloxyiminobutan-2-one, 3-acetoxyiminobutan-2-one, 3-propyonyloxyiminobutan-2-one, 2-acetoxyiminopentan-3-one, 2-acetoxyimino-1-phenylpropan-1-one, 2-benzoyloxyimino-1-phenylpropan-1-one, 3-p-toluenesulfonyloxy-iminobutan-2-one and 2-ethoxycarbonyloxyimino-1-phenylpropan-1-one.

(g) Borate Compound

The borate compound (g) preferably used as the radical initiator in the invention includes compounds represented by the following formula (5):

Formula (5):

$$R^{28}—\overset{\overset{R^{29}}{|}}{\underset{\underset{R^{30}}{|}}{B^-}}—R^{31} \quad (Z^5)^+$$

In formula (5), $R^{28}$, $R^{29}$, $R^{30}$ and $R^{31}$, which may be the same or different, each represents a substituted or unsubstituted alkyl group, a substituted or unsubstituted aryl group, a substituted or unsubstituted alkenyl group, a substituted or unsubstituted alkynyl group or a substituted or unsubstituted heterocyclic group, or at least two of $R^{28}$, $R^{29}$, $R^{30}$ and $R^{31}$ may be combined with each other to form a cyclic structure, provided that at least one of $R^{28}$, $R^{29}$, $R^{30}$ and $R^{31}$ represents a substituted or unsubstituted alkyl group. $(Z^5)^+$ represents an alkali metal cation or a quaternary ammonium cation.

Specific examples of the compound represented by formula (5) include compounds described in U.S. Pat. Nos. 3,567,453 and 4,343,891, European Patents 109,772 and 109,773, and the following compounds:

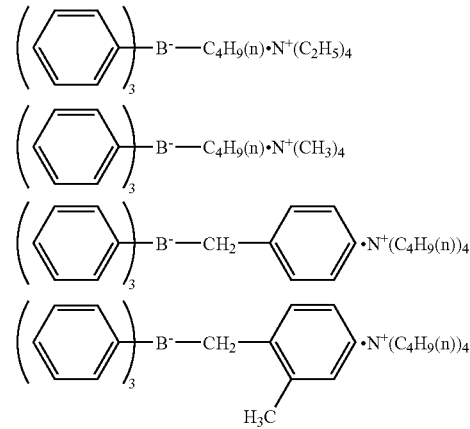

(h) Azinium Compound

The azinium compound (h) preferably used as the radical initiator in the invention includes compounds having an N—O bond described in JP-A-63-138345, JP-A-63-142345, JP-A-63-142346, JP-A-63-143537 and JP-B-46-42363.

(i) Metallocene Compound

The metallocene compound (i) preferably used as the radical initiator in the invention includes titanocene compounds described in JP-A-59-152396, JP-A-61-151197, JP-A-63-

41484, JP-A-2-249 and JP-A-2-4705, and iron-arene complexes described in JP-A-1-304453 and JP-A-1-152109.

Specific examples of the titanocene compound include dicyclopentadienyl-Ti-dichloride, dicyclopentadienyl-Ti-biphenyl, dicyclopentadienyl-Ti-bis-2,3,4,5,6-pentafluorophen-1-yl, dicyclopentadienyl-Ti-bis-2,3,5,6-tetrafluorophen-1-yl, dicyclopentadienyl-Ti-bis-2,4,6-trifluorophen-1-yl, dicyclopentadienyl-Ti-bis-2,6-difluorophen-1-yl, dicyclopentadienyl-Ti-bis-2,4-difluorophen-1-yl, dimethylcyclopentadienyl-Ti-bis-2,3,4,5,6-pentafluorophen-1-yl, dimethylcyclopentadienyl-Ti-bis-2,3,5,6-tetrafluorophen-1-yl, dimethylcyclopentadienyl-Ti-bis-2,4-difluorophen-1-yl, bis(cyclopentadienyl)bis[2,6-difluoro-3-(pyr-1-yl)phenyl]-titanium, bis(cyclopentadienyl)bis[2,6-difluoro-3-(methylsulfonamido)phenyl]titanium, bis(cyclopentadienyl)bis[2,6-difluoro-3-(N-butylpivaloylamino)phenyl]titanium, bis(cyclopentadienyl)bis[2,6-difluoro-3-(N-butyl-(4-chlorobenzoyl)amino)phenyl]titanium, bis(cyclopentadienyl)bis[2,6-difluoro-3-(N-benzyl-2,2-dimethylpentanoylamino)phenyl]titanium, bis(cyclopentadienyl)bis[2,6-difluoro-3-(N-(2-ethylhexyl)-4-tolylsulfonylamino)phenyl]titanium, bis(cyclopentadienyl)bis[2,6-difluoro-3-(N-(3-oxaheptyl)benzoylamino)phenyl]titanium, bis(cyclopentadienyl)bis[2,6-difluoro-3-(N-(3,6-dioxadecyl)benzoylamino)phenyl]titanium, bis(cyclopentadienyl)bis[2,6-difluoro-3-(trifluoromethylsulfonylamino)phenyl]titanium, bis(cyclopentadienyl)bis[2,6-difluoro-3-(trifluoroacetylamino)phenyl]titanium, bis(cyclopentadienyl)bis[2,6-difluoro-3-(2-chlorobenzoylamino)phenyl]titanium, bis(cyclopentadienyl)bis[2,6-difluoro-3-(4-chlorobenzoylamino)phenyl]titanium, bis(cyclopentadienyl)bis[2,6-difluoro-3-(N-(3,6-dioxadecyl)-2,2-dimethylpentanoylamino)phenyl]titanium, bis(cyclopentadienyl)bis[2,6-difluoro-3-(N-(3,7-dimethyl-7-methoxyoctyl)benzoylamino)phenyl]titanium and bis(cyclopentadienyl)bis[2,6-difluoro-3-(N-cyclohexylbenzoylamino)phenyl]titanium.

(j) Active Ester Compound

The active ester compound (j) preferably used as the radical initiator in the invention includes imidosulfonate compounds described in JP-B-62-6223, and active sulfonates described in JP-B-63-14340 and JP-A-59-174831.

(k) Compound Having a Carbon-Halogen Bond

The compound having a carbon-halogen bond (k) preferably used as the radical initiator in the invention includes the compounds represented by the following formulae (6) to (12):

Formula (6):

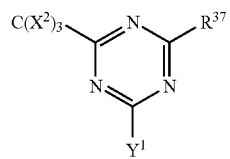

In formula (6), $X^2$ represents a halogen atom, $Y^1$ represents $-C(X^2)_3$, $-NH_2$, $-NHR^{38}$, $-N(R^{38})_2$ or $-OR^{38}$, $R^{38}$ represents an alkyl group, a substituted alkyl group, an aryl group or a substituted aryl group, and $R^{37}$ represents $-C(X^2)_3$, an alkyl group, a substituted alkyl group, an aryl group, a substituted aryl group or a substituted alkenyl group.

Formula (7):

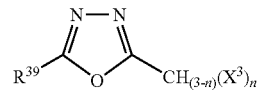

In formula (7), $R^{39}$ represents an alkyl group, a substituted alkyl group, an alkenyl group, a substituted alkenyl group, an aryl group, a substituted aryl group, a halogen atom, an alkoxy group, a substituted alkoxy group, a nitro group or a cyano group, $X^3$ represents a halogen atom, and n represents an integer of 1 to 3.

Formula (8):

In formula (8), $R^{40}$ represents an aryl group or a substituted aryl group, $R^{41}$ represents a group shown below or a halogen atom, $Z^6$ represents $-C(=O)-$, $-C(=S)-$ or $-SO_2-$, $X^3$ represents a halogen atom, and m represents 1 or 2.

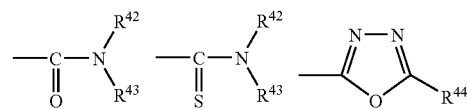

wherein $R^{42}$ and $R^{43}$ each represents an alkyl group, a substituted alkyl group, an alkenyl group, a substituted alkenyl group, an aryl group or a substituted aryl group, and $R^{44}$ has the same meaning as defined for $R^{38}$ in formula (6).

Formula (9):

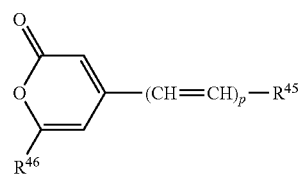

In formula (9), $R^{45}$ represents an aryl group which may be substituted or a heterocyclic group which may be substituted, $R^{46}$ represents a trihaloalkyl group or trihaloalkenyl group each having from 1 to 3 carbon atoms, and p represents 1, 2 or 3.

Formula (10):

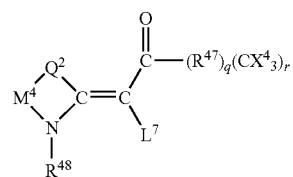

In formula (10), which represents a carbonylmethylene heterocyclic compound having a trihalogenomethyl group, $L^7$ represents a hydrogen atom or a group represented by formula —CO—$(R^{47})_q(C(X^4)_3)_r$, Q represents a sulfur atom, a selenium atom, an oxygen atom, a dialkylmethylene group, an alken-1,2-ylene group, a 1,2-phenylene group or —N(—$R^{48}$)—, $M^4$ represents a substituted or unsubstituted alkylene group, a substituted or unsubstituted alkenylene group or a 1,2-arylene group, $R^{48}$ represents an alkyl group, an aralkyl group or an alkoxyalkyl group, $R^{47}$ represents a divalent carbocyclic or heterocyclic aromatic group, $X^4$ represents a chlorine atom, a bromine atom or an iodine atom, q represents 0 or 1, and r represents 1 or 2, provided that when q represents 0, r represents 1, and when q represents 1, r represents 1 or 2.

Formula (11):

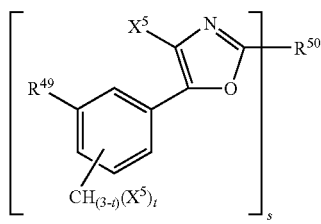

In formula (11), which represents a 4-halogeno-5-(halogenomethylphenyl)oxazole derivative, $X^5$ represents a halogen atom, t represents an integer of 1 to 3, s represents an integer of 1 to 4, $R^{49}$ represents a hydrogen atom or —$CH_{3-t}X^5_t$, and $R^{50}$ represents an s-valent unsaturated organic residue, which may be substituted.

Formula (12):

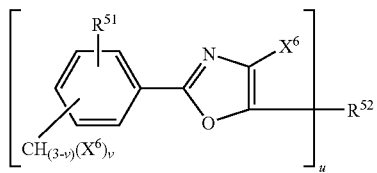

In formula (12), which represents a 2-(halogenomethylphenyl)-4-halogenooxazole derivative, $X^6$ represents a halogen atom, v represents an integer of 1 to 3, u represents an integer of 1 to 4, $R^{51}$ represents a hydrogen atom or —$CH_{3-v}X^6_v$, and $R^{52}$ represents an u-valent unsaturated organic residue, which may be substituted.

Specific examples of the compound having a carbon-halogen bond include compounds described in Wakabayashi et al., *Bull. Chem. Soc. Japan*, Vol. 42, 2924 (1969), for example, 2-phenyl-4,6-bis(trichloromethyl)-S-triazine, 2-(p-chlorophenyl)-4,6-bis(trichloromethyl)-S-triazine, 2-(p-tolyl)-4,6-bis(trichloromethyl)-S-triazine, 2-(p-methoxyphenyl)-4,6-bis(trichloromethyl)-S-triazine, 2-(2',4'-dichlorophenyl)-4,6-bis(trichloromethyl)-S-triazine, 2,4,6-tris(trichloromethyl)-S-triazine, 2-methyl-4,6-bis(trichloromethyl)-S-triazine, 2-n-nonyl-4,6-bis(trichloromethyl)-S-triazine and 2-(α,α,β-trichloroethyl)-4,6-bis(trichloromethyl)-S-triazine. Further, compounds described in British Patent 1,388,492, for example, 2-styryl-4,6-bis(trichloromethyl)-S-triazine, 2-(p-methylstyryl)-4,6-bis(trichloromethyl)-S-triazine, 2-(p-methoxylstyryl)-4,6-bis(trichloromethyl)-S-triazine and 2-(p-methoxylstyryl)-4-amino-6-trichloromethyl-S-triazine, compounds described in JP-A-53-133428, for example, 2-(4-methoxynaphth-1-yl)-4,6-bis(trichloromethyl)-S-triazine, 2-(4-ethoxynaphth-1-yl)-4,6-bis(trichloromethyl)-S-triazine, 2-[4-(2-ethoxyethyl) naphth-1-yl]-4,6-bis(trichloromethyl)-S-triazine, 2-(4,7-dimethoxynaphth-1-yl)-4,6-bis(trichloromethyl)-S-triazine and 2-(acenaphth-5-yl)-4,6-bis(trichloromethyl)-S-triazine, and compounds described in German Patent 3,337,024, for example, the compounds shown below are exemplified. Moreover, compounds which can be easily synthesized by one skilled in the art according to synthesis methods described in M. P. Hutt, E. F. Elslager and L. M. Herbel, *Journal of Heterocyclic Chemistry*, Vol. 7, No. 3, page 511 (1970), for example, the compounds shown below are exemplified.

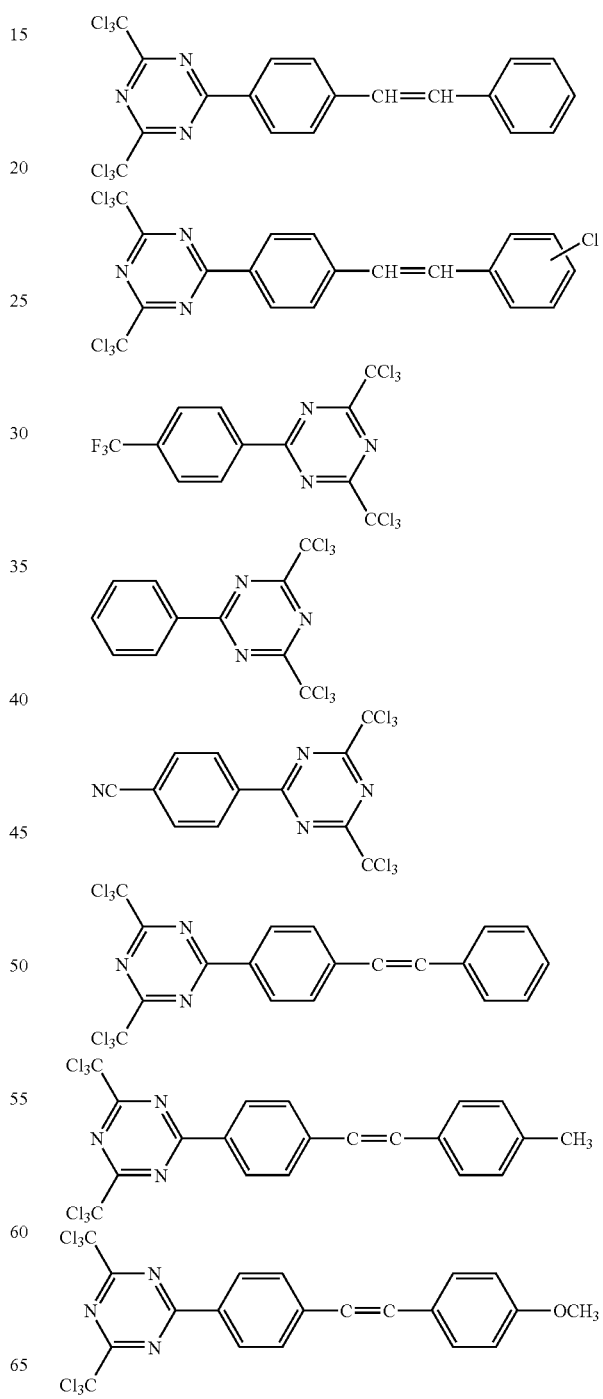

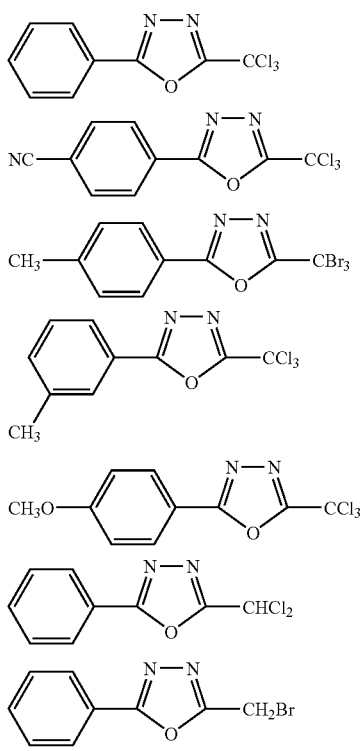

(l) Azo Series Compound

The azo series compound (l) preferably used as the radical initiator in the invention includes, for example, 2,2'-azobisisobutyronitrile, 2,2'-azobispropionitrile, 1,1'-azobis(cyclohexane-1-carbonitrile), 2,2'-azobis(2-methylbutyronitrile), 2,2'-azobis(2,4-dimethylvaleronitrile), 2,2'-azobis(4-methoxy-2,4-dimethylvaleronitrile), 4,4'-azobis(4-cyanovaleric acid), dimethyl 2,2'-azobisisobutyrate, 2,2'-azobis(2-methylpropionamidooxime), 2,2'-azobis[2-(2-imidazolin-2-yl) propane], 2,2'-azobis{2-methyl-N-[1,1-bis(hydroxymethyl)-2-hydroxyethyl]propionamide}, 2,2'-azobis[2-methyl-N-(2-hydroxyethyl)propionamide], 2,2'-azobis(N-butyl-2-methylpropionamide), 2,2'-azobis(N-cyclohexyl-2-methylpropionamide), 2,2'-azobis[N-(2-propenyl)-2-methylpropionamide] and 2,2'-azobis(2,4,4-trimethylpentane).

More preferable examples of the radical initiator for use in the invention include the above-described aromatic ketone (a), onium salt compound (b), organic peroxide (c), hexaarylbiimidazole compound (e), metallocene compound (i) and compound having a carbon-halogen bond (k), and most preferable examples of the radical initiator include the aromatic iodonium salt, aromatic sulfonium salt, titanocene compound and trihalomethyl-S-triazine compound represented by formula (6) described above.

The radical initiator can be added to the polymerizable composition (the decomposable resin composition containing the polymerizable compound) ordinarily from 0.1 to 50% by weight, preferably from 0.5 to 30% by weight, particularly preferably from 5 to 20% by weight, based on the total solid content of the polymerizable composition.

The radical initiators can be preferably used individually or in combination of two or more thereof in the invention.

[5] Other Components

To the decomposable resin composition according to the invention, other components suitable for the use and production method thereof may further be appropriately added. Preferable examples of the additive are described below.

<Sensitizing Dye>

In the case wherein the exposure is conducted using as a light source, a laser (for example, YAG laser) emitting an infrared ray of 760 to 1,200 nm, an infrared absorbing agent is ordinarily used. The infrared absorbing agent has a function of converting the infrared ray absorbed to heat. Upon the heat thus-generated the radical initiator (polymerization initiator) is thermally decomposed to generate a radical. The infrared absorbing agent for use in the invention includes a dye and pigment each having an absorption maximum in a wavelength range of 760 to 1,200 nm.

As the dye, commercially available dyes and known dyes described in literatures, for example, *Senryo Binran* (Dye Handbook) compiled by The Society of Synthetic Organic Chemistry, Japan (1970) can be used. Specifically, the dye includes azo dyes, metal complex azo dyes, pyrazolone azo dyes, naphthoquinone dyes, anthraquinone dyes, phthalocyanine dyes, carbonium dyes, quinoneimine dyes, methine dyes, cyanine dyes, squarylium dyes, pyrylium salts and metal thiolate complexes.

Examples of preferable dye include cyanine dyes described, for example, in JP-A-58-125246, JP-A-59-84356, JP-A-59-202829 and JP-A-60-78787, methine dyes described, for example, in JP-A-58-173696, JP-A-58-181690 and JP-A-58-194595, naphthoquinone dyes described, for example, in JP-A-58-112793, JP-A-58-224793, JP-A-59-48187, JP-A-59-73996, JP-A-60-52940 and JP-A-60-63744, squarylium dyes described, for example, in JP-A-58-112792, and cyanine dyes described, for example, in British Patent 434,875.

Also, near infrared absorbing sensitizers described in U.S. Pat. No. 5,156,938 are preferably used. Further, substituted arylbenzo(thio)pyrylium salts described in U.S. Pat. No. 3,881,924, trimethinethiapyrylium salts described in JP-A-57-142645 (corresponding to U.S. Pat. No. 4,327,169), pyrylium compounds described in JP-A-58-181051, JP-A-58-220143, JP-A-59-41363, JP-A-59-84248, JP-A-59-84249, JP-A-59-146063 and JP-A-59-146061, cyanine dyes described in JP-A-59-216146, pentamethinethiopyrylium salts described in U.S. Pat. No. 4,283,475, and pyrylium compounds described in JP-B-5-13514 and JP-B-5-19702 are also preferably used. Other preferable examples of the dye include near infrared absorbing dyes represented by formulae (I) and (II) in U.S. Pat. No. 4,756,993.

Other preferable examples of the infrared absorbing dye according to the invention include specific indolenine cyanine dyes described in Japanese Patent Application Nos. 2001-6326 and 2001-237840.

Of the dyes, cyanine dyes, squarylium dyes, pyrylium dyes, nickel thiolate complexes and indolenine cyanine dyes are preferred. Further, cyanine dyes and indolenine cyanine dyes are more preferred.

Specific examples of the cyanine dye preferably used in the invention include those described in Paragraph Nos. [0017] to [0019] of Japanese Patent Application No. 11-310623, Paragraph Nos. [0012] to [0038] of Japanese Patent Application No. 2000-224031 and Paragraph Nos. [0012] to [0023] of Japanese Patent Application No. 2000-211147.

The dye represented by formula (d) or (e) shown below is also preferable.

Formula (d):

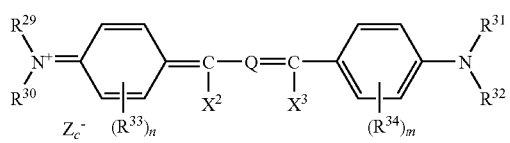

In formula (d), $R^{29}$ to $R^{32}$ each independently represents a hydrogen atom, an alkyl group or an aryl group. $R^{33}$ and $R^{34}$ each independently represents an alkyl group, a substituted oxy group or a halogen atom. n and m each independently represents an integer of 0 to 4. $R^{29}$ and $R^{30}$ or $R^{31}$ and $R^{32}$ may be combined with each other to form a ring. Also, $R^{29}$ and/or $R^{30}$ and $R^{33}$ or $R^{31}$ and/or $R^{32}$ and $R^{34}$ may be combined with each other to form a ring. Further, when plural $R^{33}$s or $R^{34}$s are present, the $R^{33}$s or $R^{34}$s may be combined with each other to form a ring. $X^2$ and $X^3$ each independently represents a hydrogen atom, an alkyl group or an aryl group, provided that at least one of $X^2$ and $X^3$ represents a hydrogen atom or an alkyl group. Q represents a trimethine group which may have a substituent or a pentamethine group which may have a substituent or may form a ring structure together with a divalent organic group. $Zc^-$ represents a counter anion. However, $Zc^-$ is not necessary when the dye represented by formula (d) has an anionic substituent in the structure thereof and neutralization of charge is not needed. Preferable examples of the counter ion for $Zc^-$ include a halogen ion, a perchlorate ion, a tetrafluoroborate ion, a hexafluorophosphate ion and a sulfonate ion, and particularly preferable examples thereof include a perchlorate ion, a hexafluorophosphate ion and an arylsulfonate ion in view of the preservation stability of a coating solution for decomposable resin composition layer.

Specific examples of the dye represented by formula (d) preferably used in the invention include those illustrated below.

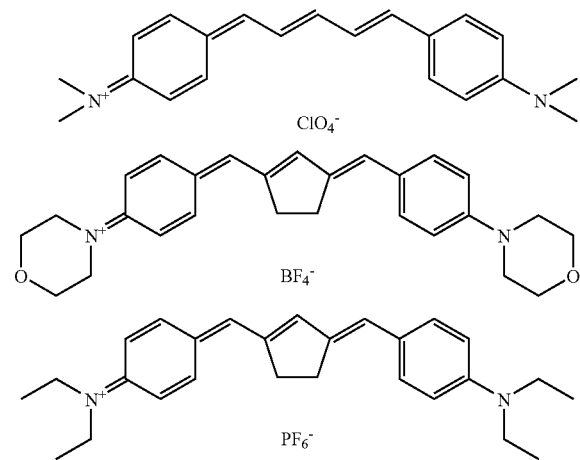

Formula (e):

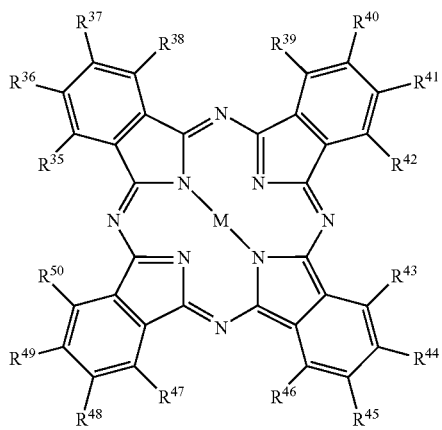

In formula (e), $R^{35}$ to $R^{50}$ each independently represents a hydrogen atom, a halogen atom, a cyano group, an alkyl group, an aryl group, an alkenyl group, an alkynyl group, a hydroxy group, a carbonyl group, a thio group, a sulfonyl group, a sulfinyl group, an oxy group, an amino group or an onium salt structure. When a substituent can be introduced into these groups, they may have the substituent. M represents two hydrogen atoms, a metal atom, a halometal group or an oxymetal group. Examples of the metal atom included therein include atoms of Groups IA, IIA, IIIB and IVB of the Periodic Table, transition metals of the first, second and third period, and lanthanoid elements. Among them, copper, magnesium, iron, zinc, cobalt, aluminum, titanium and vanadium are preferred.

Specific examples of the dye represented by formula (e) preferably used in the invention include those illustrated below.

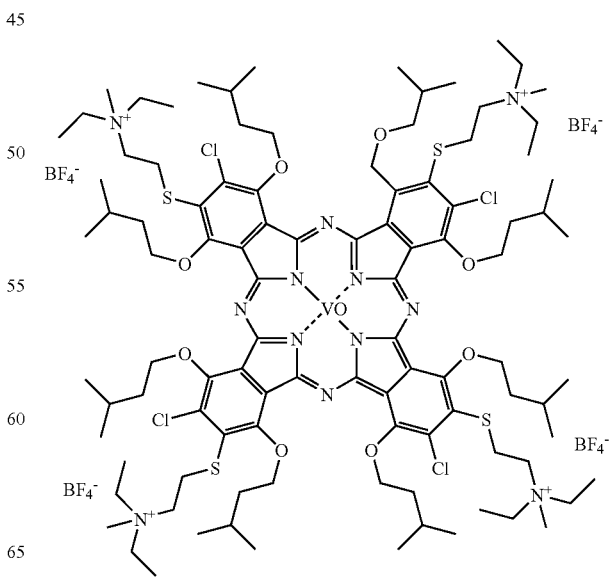

-continued

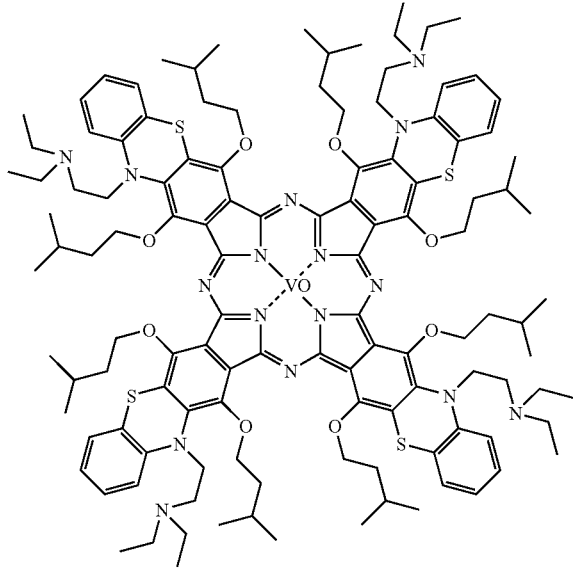

Examples of the pigment for use in the invention include commercially available pigments and pigments described in Colour Index (C.I.), *Saishin Ganryo Binran* (Handbook of the Newest Pigments) compiled by Pigment Technology Society of Japan (1977), *Saishin Ganryo Oyou Gijutsu* (Newest Application on Technologies for Pigments), CMC Publishing Co., Ltd. (1986) and *Insatsu Ink Gijutsu* (Printing Ink Technology), CMC Publishing Co., Ltd. (1984).

Examples of the pigment include black pigments, yellow pigments, orange pigments, brown pigments, red pigments, purple pigments, blue pigments, green pigments, fluorescent pigments, metal powder pigments and polymer-bonded dyes. Specific examples of usable pigment include insoluble azo pigments, azo lake pigments, condensed azo pigments, chelated azo pigments, phthalocyanine pigments, anthraquinone pigments, perylene and perynone pigments, thioindigo pigments, quinacridone pigments, dioxazine pigments, isoindolinone pigments, quinophthalone pigments, dying lake pigments, azine pigments, nitroso pigments, nitro pigments, natural pigments, fluorescent pigments, inorganic pigments and carbon black. Of the pigments, carbon black is preferred.

The pigment may be used without undergoing surface treatment or may be used after the surface treatment. For the surface treatment, a method of coating a resin or wax on the surface, a method of attaching a surfactant and a method of bonding a reactive substance (for example, a silane coupling agent, an epoxy compound or polyisocyanate) to the pigment surface. The surface treatment methods are described in *Kinzoku Sekken no Seishitsu to Oyo* (Properties and Applications of Metal Soap), Saiwai Shobo, *Insatsu Ink Gijutsu* (Printing Ink Technology), CMC Publishing Co., Ltd. (1984), and *Saishin Ganryo Oyo Gijutsu* (Newest Application on Technologies for Pigments), CMC Publishing Co., Ltd. (1986).

The pigment has a particle size of preferably from 0.01 to 10 μm, more preferably from 0.05 to 1 μm, particularly preferably from 0.1 to 1 μm. When the particle size of the pigment is 0.01 μm or more, stability of the pigment dispersion in a coating solution increases and when it is 10 μm or less, uniformity of the decomposable resin composition layer is good.

For dispersing the pigment, a known dispersion technique for use in the production of ink or toner may be used. Examples of the dispersing machine include an ultrasonic dispersing machine, a sand mill, an attritor, a pearl mill, a super-mill, a ball mill, an impeller, a disperser, a KD mill, a colloid mill, a dynatron, a three roll mill and a pressure kneader. The dispersing machines are described in detail in *Saishin Ganryo Oyo Gijutsu* (Newest Application on Technologies for Pigments), CMC Publishing Co., Ltd. (1986).

When the decomposable resin composition according to the invention is applied to the resin composition layer of a flexographic printing plate precursor, the sensitizing dye, for example, the infrared absorbing agent, which is added in order to accelerate hardening of the decomposable resin composition may be added to the resin composition layer or may be added to a different layer, for example, an overcoat layer or a undercoat layer, separately provided.

<Co-Sensitizer>

The sensitivity can be further improved by using a certain additive (hereinafter referred to as a "co-sensitizer"). The operation mechanism of the co-sensitizer is not quite clear but may be considered to be mostly based on the following chemical process. Specifically, the co-sensitizer reacts with various intermediate active species (for example, a radical or a cation) generated during the process of photo-reaction initiated by the initiator and subsequent addition-polymerization reaction to produce new active radicals. The co-sensitizers are roughly classified into (a) compound which is reduced to produce an active radical, (b) compound which is oxidized to produce an active radical and (c) compound which reacts with a radical having low activity to convert it into a more highly active radical or acts as a chain transfer agent. However, in many cases, a common view about which an individual compound belongs to which type is not present.

(a) Compound Which is Reduced to Produce an Active Radical

Compound Having Carbon-Halogen Bond:

An active radical is considered to be generated by the reductive cleavage of the carbon-halogen bond. Specific examples of the compound preferably used include a trihalomethyl-s-triazine and a trihalomethyloxadiazole.

Compound Having Nitrogen-Nitrogen Bond:

An active radical is considered to be generated by the reductive cleavage of the nitrogen-nitrogen bond. Specific examples of the compound preferably used include a hexaarylbiimidazole.

Compound Having Oxygen-Oxygen Bond:

An active radical is considered to be generated by the reductive cleavage of the oxygen-oxygen bond. Specific examples of the compound preferably used include an organic peroxide.

Onium Compound:

An active radical is considered to be generated by the reductive cleavage of a carbon-hetero bond or oxygen-nitrogen bond. Specific examples of the compound preferably used include a diaryliodonium salt, a triarylsulfonium salt and an N-alkoxypyridinium (azinium) salt.

Ferrocene and Iron-Arene Complexes:

An active radical can be reductively generated.

(b) Compound Which is Oxidized to Produce an Active Radical

Alkylate Complex:

An active radical is considered to be generated by the oxidative cleavage of a carbon-hetero bond. Specific examples of the compound preferably used include a triaryl alkyl borate.

Alkylamine Compound:

An active radical is considered to be generated by the oxidative cleavage of a C—X bond on the carbon adjacent to nitrogen, wherein X is preferably a hydrogen atom, a carboxyl group, a trimethylsilyl group or a benzyl group. Specific examples of the compound include an ethanolamine, an N-phenylglycine and an N-trimethylsilylmethylaniline.

Sulfur-Containing or Tin-Containing Compound:

A compound in which the nitrogen atom of the above-described amine compound is replaced by a sulfur atom or a tin atom is considered to generate an active radical in the same manner. Also, a compound having an S—S bond is known to effect sensitization by the cleavage of the S—S bond.

α-Substituted Methylcarbonyl Compound:

An active radical can be generated by the oxidative cleavage of carbonyl-α-carbon bond. The compound in which the carbonyl is converted into an oxime ether also shows the similar function. Specific examples of the compound include an 2-alkyl-1-[4-(alkylthio)phenyl]-2-morpholinopronone-1 and an oxime ether obtained by a reaction of the 2-alkyl-1-[4-(alkylthio)phenyl]-2-morpholinopronone-1 with a hydroxyamine and subsequent etherification of the N—OH.

Sulfinic Acid Salt:

An active radical can be reductively generated. Specific examples of the compound include sodium arylsulfinate.

(c) Compound Which Reacts with a Radical to Convert it into a More Highly Active Radical or Acts as a Chain Transfer Agent:

For example, a compound having SH, PH, SiH or GeH in its molecule is used as the compound which reacts with a radical to convert it into a more highly active radical or acts as a chain transfer agent. The compound donates hydrogen to a low active radical species to generate a radical or is oxidized and deprotonized to generate a radical. Specific examples of the compound include a 2-mercaptobenzothiazole, a 2-mercaptobenzoxazole and a 2-mercaptobenzimidazole.

A large number of examples of the co-sensitizer are more specifically described, for example, in JP-A-9-236913 as additives for the purpose of increasing sensitivity, and they can be used in the invention. Some of them are set forth below, but the invention should not be construed as being limited thereto.

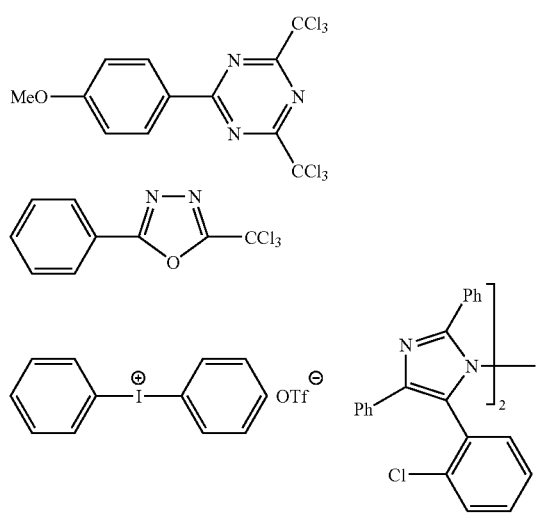

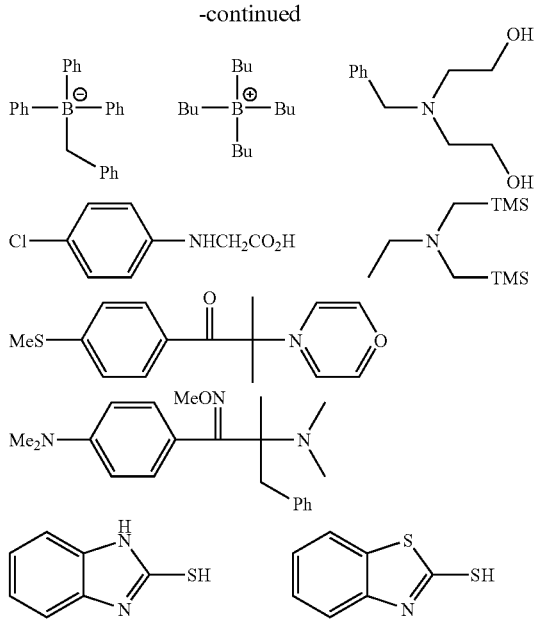

Similarly to the above-described sensitizing dye, the co-sensitizer can be subjected to various chemical modifications so as to improve the characteristics of the resin composition layer. For instance, methods, for example, binding to the sensitizing dye, initiator compound, addition-polymerizable unsaturated compound or other part, introduction of a hydrophilic site, introduction of a substituent for improving compatibility or inhibiting deposition of crystal, introduction of a substituent for improving an adhesion property, and formation of a polymer, may be used.

The co-sensitizers may be used individually or in combination of two or more thereof. The amount of the co-sensitizer used is ordinarily from 0.05 to 100 parts by weight, preferably from 1 to 80 parts by weight, more preferably from 3 to 50 parts by weight, per 100 parts by weight of the polymerizable compound having an ethylenically unsaturated double bond.

<Polymerization Inhibitor>

It is preferred to add a small amount of a thermal polymerization inhibitor to the resin composition according to the invention, in order to prevent undesirable thermal polymerization of the polymerizable compound having an ethylenically unsaturated double bond during the production or preservation of the resin composition. Suitable examples of the thermal polymerization inhibitor include hydroquinone, p-methoxyphenol, di-tert-butyl-p-cresol, pyrogallol, tert-butylcatechol, benzoquinone, 4,4'-thiobis(3-methyl-6-tert-butylphenol), 2,2'-methylenebis(4-methyl-6-tert-butylphenol) and N-nitrosophenylhydroxyamine cerium(III) salt. The amount of the thermal polymerization inhibitor added is preferably from about 0.01 to about 5% by weight based on the total resin composition. In the case of coating the resin composition as the decomposable resin composition layer of a flexographic printing plate precursor, in order to avoid polymerization inhibition due to oxygen, a higher fatty acid derivative, for example, behenic acid or behenic amide may be added and allowed to localize on the resin composition layer surface during the drying step after the coating thereof, if desired. The amount of the higher fatty acid derivative added is preferably from about 0.5 to about 10% by weight based on the total resin composition.

<Coloring Agent>

In the case of using the resin composition according to the invention in the flexographic printing plate precursor, a coloring agent of a dye or a pigment may further be added for the purpose of coloring the resin composition layer thereof. By the coloring, a so-called plate inspection property, for example, visibility of a printing plate after the plate-making or aptitude for an image density measurement apparatus can be improved. Since many dyes cause reduction in the sensitivity of resin composition layer, a pigment is preferably used as the coloring agent. Specific examples the coloring agent include a pigment, for example, a phthalocyanine pigment, an azo pigment, carbon black or titanium oxide, and a dye, for example, Ethyl Violet, Crystal Violet, an azo dye, an anthraquinone dye or a cyanine dye. The amount of the coloring agent added is preferably from about 0.5 to about 5% by weight based on the total resin composition.

<Other Additives>

In the case of using the resin composition according to the invention in the flexographic printing plate precursor, known additives, for example, a filler or a plasticizer for improving physical properties of the hardened layer, or an oil-sensitizer capable of improving the ink-receptive property on the surface of decomposable resin composition layer may be further added.

The filler may be an organic compound, an inorganic compound or a mixture thereof. Examples of the organic compound include carbon black, carbon nanotube, fullerene and graphite. Examples of the inorganic compound include silica, alumina, aluminum and calcium carbonate.

Examples of the plasticizer include dioctyl phthalate, didodecyl phthalate, triethylene glycol dicaprylate, dimethyl glycol phthalate, tricresyl phosphate, dioctyl adipate, dibutyl sebacate and triacetyl glycerol. In the case of using a binder, the plasticizer can be added in an amount of 10% by weight or less based on the total weight of the compound having an ethylenically unsaturated double bond and the binder.

[6] Support

A material having flexibility and excellent dimensional stability is preferably used as the support in the invention. Examples of the support include a polyethylene terephthalate film, a polyethylene naphthalate film, a polybutylene terephthalate film and a polycarbonate film. The thickness of the support is ordinarily from 50 to 350 μm and preferably from 100 to 250 μm from the standpoint, for example, of mechanical characteristics and shape stability of the printing plate precursor and handling property at the plate-making. Also, in order to increase adhesion between the support and the resin composition layer, a known adhesive conventionally used for such a purpose may be provided on the surface of the support, if desired.

Further, the adhesion property to the resin composition layer or the adhesive layer can be improved by conducting physical or chemical treatment on the surface of support used in the invention. Examples of the physical treatment include a sand blast method, a wet sand blast method spraying liquid containing fine particles, a corona discharge treatment method, a plasma treatment method or an ultraviolet ray or vacuum ultraviolet ray irradiation method. Examples of the chemical treatment include a treatment method with a strong acid or a strong alkali, a treatment method with an oxidant and treatment method with a coupling agent.

[7] Formation Method of Film (Plate)

In order to shape the decomposable resin composition according to the invention into a sheet form or a cylindrical form, a molding method for conventional resin can be used. For example, a casting method, a method of extruding the resin composition from a nozzle or dies using a machine, for example, a pump or an extruder and adjusting the thickness by a blade or calendering with roller is exemplified. In such case, it is also possible to perform the molding accompanied with heating within a range wherein the performance of the resin composition is not damaged. Also, a rolling treatment, a grinding treatment or the like may be carried out, if desired. Ordinarily, the resin composition is molded on an underlay referred to as a back film composed of a material, for example, PET or nickel in many cases. It is also a case wherein the resin composition is molded directly on a cylinder of a printing machine. Further, a cylindrical support made of fiber reinforced plastic (FRP), plastic or metal can also be used. As the cylindrical support, a hollow cylindrical support having a constant thickness can be used for the purpose of weight saving. The role of the back film or cylindrical support is to ensure the dimensional stability of printing plate precursor. Therefore, a material with high dimensional stability should be selected. Specific examples of the material include a crystalline resin, for example, a polyester resin, a polyimide resin, a polyamide resin, polyamideimide resin, a polyetherimide resin, polybismaleimide resin, a polysulfone resin, a polycarbonate resin, a polyphenyleneether resin, a polyphenylenethioether resin, a polyehtersulsone resin or a full aromatic polyester resin, a full aromatic polyamide resin and an epoxy resin. Further, the resins may be used in the form of laminate. For example, a sheet composed of a full aromatic polyamide film having a thickness of 4.5 μm both surfaces of which are laminated with a polyethylene terephthalate layer having a thickness of 50 μm is exemplified. Moreover, a porous sheet, for example, a cloth formed by knitting of fiber, a nonwoven cloth or a film having fine pores can be used as the back film. In the case of using a porous sheet as the back film, when the decomposable resin composition is impregnated into the pores of the porous sheet and subjected to light curing, a high adhesive property can be achieved by means of integration of the cured decomposable resin layer and the back film. Examples of the fiber for the formation of cloth or nonwoven cloth include, an inorganic fiber, for example, a glass fiber, an alumina fiber, a carbon fiber, an alumina-silica fiber, a boron fiber, a high silicon fiber, a potassium titanate fiber or a sapphire fiber, a natural fiber, for example, cotton or hemp, a semisynthetic fiber, for example, rayon or acetate, and a synthetic fiber, for example, nylon, polyester, acryl, vinylon, polyvinyl chloride, polyolefin, polyurethane, polyimide or aramide. Furthermore, cellulose produced by a bacterium is a high crystalline nanofiber and a material capable of forming a thin and highly dimensionally stable nonwoven fiber.

[8] Thickness of Printing Plate Precursor

The thickness of the printing plate precursor for use in laser engraving can be appropriately determined depending on the purpose of utilization. When it is used for a printing plate, the thickness is preferably in a range of 0.005 to 10 mm. In view of printing durability of the printing plate and ease of the laser engraving, it is more preferably in a range of 0.1 to 7 mm. In some cases, the materials having different compositions may be multiply laminated.

The thickness of the decomposable resin composition layer is ordinarily from 0.0005 to 10 mm, preferably from 0.005 to 7 mm.

As a combination of plural layers, for example, it is possible to from a layer capable of undergoing engraving using a laser having an emitting wavelength in a near infrared region, for example, a YAG laser, a fiber laser or a semiconductor laser as the uppermost layer and under the layer, a layer capable of undergoing laser engraving using an infrared laser, for example, a carbon dioxide gas laser or a visible-ultraviolet laser is formed. In the case of conducting the laser engraving of such laminate, different laser engraving apparatus equipped with an infrared laser and a near infrared laser respectively can be employed or one laser engraving apparatus equipped with both of an infrared laser and a near infrared laser can be employed.

[9] Other Layers

According to the invention, a cushion layer composed of a resin or rubber having cushioning property can be formed between the support and a film made of resin (layer other than the decomposable resin composition layer) or between the film made of resin and the decomposable resin composition layer. In the case of forming the cushion layer between the support and the film made of resin, a method of preparing the cushion layer having an adhesive layer on one side and pasting the adhesive layer side thereof onto the cylindrical support is simple. After pasting the cushioning layer, the surface may be subjected to cutting and polishing to shape. In a simpler manner, a liquid photosensitive resin composition is coated on the support in a constant thickness and cured with light to from the cushion layer. It is preferable for the cushion layer to have the cushioning property that the hardness of the cushion layer cured with light is low. The photosensitive resin layer cured with light having the cushioning property may contain bubbles. It is also possible that the surface of the cushion layer is subjected to cutting and polishing to shape. The cushion layer thus-prepared is useful as a seamless cushion layer.

[10] Condition of Laser Engraving

In the laser engraving, a relief image is formed on the printing plate precursor by making digitalized data based on the image to be formed and operating a laser equipment utilizing a computer.

The laser used in the laser engraving can be any laser as long as it contains a beam of wavelength at which the printing plate precursor has absorption. In order to carry out the engraving with high speed, a laser having a high power is desirable. One preferable example of the laser is a laser having an emitting wavelength in an infrared region or near infrared region, for example, a carbon dioxide gas laser, a YAG laser, a semiconductor laser or a fiber laser. Also, an ultraviolet laser having an emitting wavelength in an ultraviolet region, for example, an excimer laser, a YAG laser wavelength-converted to the third harmonic or the fourth harmonic or a copper vapor laser is able to conduct ablation processing which cleaves a bond between organic molecules and thus is suitable for microfabrication. A laser having an extremely high peak power, for example, a femtosecond laser can also be employed. The laser irradiation may be performed continuously or pulsewise.

Although the engraving with laser is conducted under oxygen-containing gas, ordinarily in the presence of air or in airflow, it can be conducted under carbon dioxide gas or nitrogen gas. After the completion of the engraving, the powdery or liquid substance slightly occurred on the surface of relief printing plate may be removed by an appropriate method, for example, a method of washing out, for example, with a solvent or water containing a surfactant, a method of spraying an aqueous cleaning agent, for example, by a high-pressure sprayer, or a method of spraying high-pressure steam.

The printing plate precursor according to the invention can be applied to various usages, for example, a stamp, a seal, a design roll for embossing, a relief image for patterning an insulator, resistor or conductive paste used for the production of electronic components, a relief image for a mold material of ceramic materials, a relief image for display, for example, an advertising board or a sign board, or a prototype or matrix of various moldings, as well as the relief image for a printing plate.

[11] Surface Treatment After Laser Engraving

It is also achieved to decrease tackiness on the surface of printing plate or improve ink receptivity by forming a modifying layer on the surface of the printing plate having the concavo-convex pattern according to the invention. As the modifying layer, a coating treated with a compound reacting with the surface hydroxy group, for example, a silane coupling agent or a titanium coupling agent or a polymer film containing porous inorganic particles is exemplified. The silane coupling agent widely used is a compound having in its molecule a functional group having high reactivity with the surface hydroxy group of a substrate. Examples of such a functional group include a trimethoxysilyl group, an triethoxysilyl group, a trichlorosilyl group, a diethoxysilyl group, a dimethoxysilyl group, a dichlorosilyl group, a monoethoxysilyl group, a monomethoxysilyl group and a monochlorosilyl group. At least one of the functional groups is present in the molecule and the compound is fixed on the surface of substrate by the reaction of the functional group with the surface hydroxy group of substrate. Further, as the compound constituting the silane coupling agent according to the invention, that having in its molecule at least one reactive functional group selected from an acryloyl group, a methacryloyl group, an active halogen-containing amino group, an epoxy group, a vinyl group, a perfluoroalkyl group and a mercapto group or that having in its molecule a long chain alkyl group is also used.

When the molecule of the coupling agent fixed on the surface particularly has a polymerizable reactive group, the more solid coating can be formed by irradiating the surface with light, heat or an electron beam after the fixing on the surface to form crosslinkage.

A treating solution is prepared by diluting the above-described coupling agent with a mixed solution of water and an alcohol or aqueous acetic acid and an alcohol, if desired. The concentration of the coupling agent in the treating solution is preferably from 0.05 to 10.0% by weight.

A method of treatment with the coupling agent is described below. The treating solution containing the coupling agent is used by coating on the surface of printing plate precursor or the surface of printing plate after the laser engraving. The method for coating the treating solution of coupling agent is not particularly restricted and, for example, a dip coating method, spray coating method, a roll coating method or a brush coating method can be appropriately used. Although the coating treatment temperature and coating treatment time are also not particularly restricted, the treatment temperature is preferably from 5 to 60° C. and the treatment time is preferably from 0.1 to 60 seconds. The drying of the treatment solution layer on the surface of printing plate is preferably performed with heating and the heating temperature is preferably from 50 to 150° C.

By irradiating the surface of printing plate with light of vacuum ultraviolet region having a wavelength of 200 nm or shorter, for example, a xenon excimer lamp or exposing the surface of printing plate to high energy atmosphere, for example, plasma, prior to the treatment of the surface of printing plate with the coupling agent, hydroxy groups are generated on the surface of printing plate and the coupling agents can be fixed in high density.

Further, when the layer containing the inorganic porous particles is revealed on the surface of printing plate, by treating the surface with high energy atmosphere, for example, plasma, to remove somewhat the organic substance layer by etching, fine concavity and convexity can be formed on the surface of printing plate. According to the treatment, the effects of decrease in tackiness on the surface of printing plate and improvement in ink receptivity due to ease of ink absorption of the inorganic porous particles revealed on the surface are expected.

EXAMPLES

Preparation of Polymer Composition for Evaluating Physical Properties of Polymer Before and After Heating The polymer composition was prepared by mixing 10 g of the polymer shown in Table 1 below and 0.01 g of the metathesis catalyst shown in Table 1 below in a kneader for laboratory at material temperature of 100° C.

<Measurement of Thermophysical Property>

The initiation temperature of thermal decomposition was measured under the conditions described below. The term "initiation temperature of thermal decomposition" as used herein means temperature at which decrease of weight resulting from the thermal decomposition of a sample initiates while the sample has been heated.

<Equipment>

Thermogravimetric apparatus (produced by TA Instruments Japan Co., Ltd.)

<Condition of Measurement>

From the polymer composition prepared above, 10 g was weighed for a sample. The sample was heated from 30 to 550° C. at a temperature rising rate of 10° C./minute.

<Measurement of Weight Average Molecular Weight After Heating>

In an oven at 200° C., 10 g of the polymer composition prepared above was allowed to stand for 10 minutes, and then it was allowed to cool at room temperature for 30 minutes. The weight average molecular weight of the polymer composition was measured using GPC (gel permeation chromatography) under the conditions described below.

Sample for GPC Measurement:

The polymer composition after the heating was dissolve in tetrahydrofuran to prepare a solution of 1% by weight for measurement.

<Condition of Measurement>
Eluent: Tetrahydrofuran
Flow rate: One ml/minute
Detector: Detection in RI mode
Column temperature: 40° C.
Column used: Four columns of TSKgel GMHXL, TSKgel G4000HXL, TSKgel G3000HXL and TSKgel G2000HXL connected in series

TABLE 1

Evaluation Results of Change in Physical Properties of Polymer with Heating

| | Polymer | Metathesis Catalyst | Initiation Temperature of Thermal Decomposition of Polymer (° C.) | Weight Average Molecular Weight after Heating (×10$^4$) |
|---|---|---|---|---|
| Example 1 | A | M-1 | 140 | 0.8 |
| Example 2 | A | M-2 | 142 | 0.8 |
| Example 3 | A | M-3 | 145 | 0.9 |
| Example 4 | A | M-4 | 163 | 1.1 |
| Example 5 | A | M-5 | 160 | 1.0 |
| Example 6 | A | M-6 | 170 | 2.6 |
| Example 7 | A | M-7 | 167 | 2.5 |
| Example 8 | A | M-8 | 174 | 2.7 |
| Example 9 | A | M-9 | 190 | 4.2 |
| Example 10 | A | M-10 | 190 | 5.0 |
| Example 11 | B | M-1 | 148 | 2.1 |
| Example 12 | B | M-2 | 155 | 2.4 |
| Example 13 | B | M-3 | 162 | 3.1 |
| Example 14 | B | M-4 | 168 | 3.2 |
| Example 15 | B | M-5 | 160 | 2.9 |
| Comparative Example 1 | A | None | 400 | 11.0 |
| Comparative Example 2 | B | None | 420 | 13.0 |

Polymer A: Styrene-butadiene block copolymer (trade name: TR2000, produced by JSR Corp.); Weight average molecular weight before heating: $12.0 \times 10^4$ Polymer B: Styrene-butadiene block copolymer (trade name: SIS5200P, produced by JSR Corp.); Weight average molecular weight before heating: $13.5 \times 10^4$ The structures of Metathesis Catalysts M-1 to M-10 are shown below.

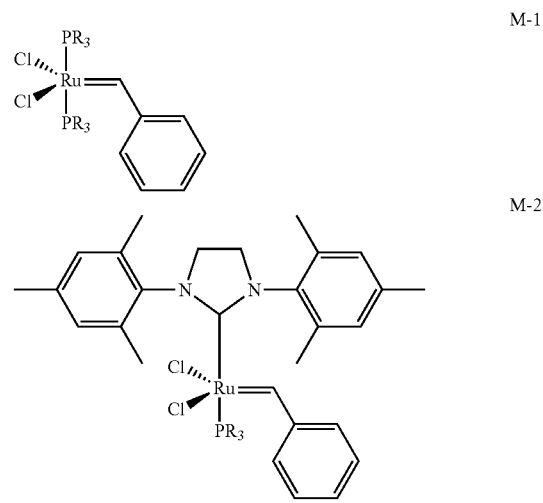

-continued

M-3
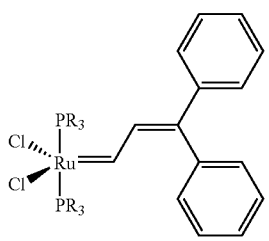

M-4
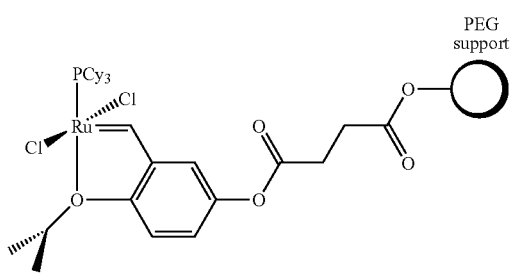
PEG support

M-5
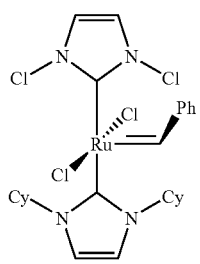

M-6
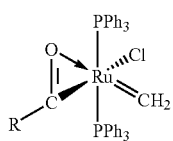

M-7
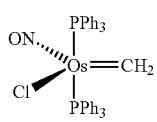

M-8
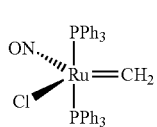

M-9
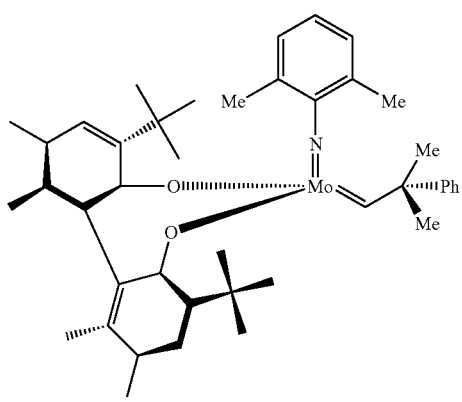

-continued

M-10
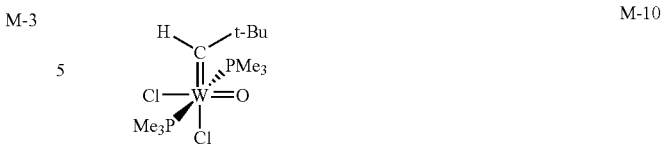

From the results shown in Table 1, it is apparent that in the examples (containing the metathesis catalyst) the initiation temperature of thermal decomposition decreases to not higher than 200° C. and the weight average molecular weight after heating at 200° C. also remarkably decreases in any sample in comparison with the comparative examples (without the metathesis catalyst).

These results indicate that the thermal decomposition property of the polymer is increased by the action of the metathesis catalyst.

<Preparation of Sample for Evaluation of Flexographic Printing Property (Depth of Engraving)>

TABLE 2

| Composition of Relief Layer | | |
|---|---|---|
| Component of Relief Layer | Starting Material | Amount (% by weight) |
| Polymer | Styrene-butadiene block copolymer (trade name: TR2000, produced by JSR Corp.) | 80.00 |
| Polymerizable Compound | Hexanediol dimethacrylate | 13.98 |
| Initiator | Benzyl dimethyl ketal | 1.50 |
| Laser Irradiation Absorber | Finely divided carbon black | 3.50 |
| Additive | 1,4-Benzoquinone (ozone degradation preventing wax) | 1.00 |
| Metathesis Catalyst | Shown in Table 3 below | 0.02 |

At the formation of the relief layer shown in Table 2 on a support, the polymer, additive and laser irradiation absorber were mixed first in a kneader for laboratory at material temperature of 100° C. After 15 minutes, the laser irradiation absorber was uniformly dispersed. The resulting mixture was then dissolved in toluene together with the polymerizable compound (monomer) below 80° C., cooled to 60° C. and cast on an uncoated PET film having a thickness of 125 μm. The film was dried in the atmosphere at room temperature for 24 hours and then dried at 60° C. for 3 hours. Thereafter, the relief layer (thickness: 1,000 μm) formed was laminated to a second PET film having a thickness of 125 μm coated with a mixture of adhesion forming components to transfer the relief layer onto the second PET film.

Then, the entire surface of the relief layer was irradiated with UVA light (long wavelength UV light of 315 to 380 nm) for 15 minutes to prepare each sample for evaluation used in Examples 16 to 22 and Comparative Examples 3 and 4.

The evaluation of the depth of engraving with laser was performed by engraving using a high-grade $CO_2$ Laser Marker ML-9100 Series (produced by Keyence Corp.) at 12 W and line speed of 20 cm/sec with respect to a carbon dioxide ($CO_2$) laser or engraving using a Marker Engine 3000 (produced by Laserfront Technologies, Inc.) at 10 W and line speed of 10 cm/sec with respect to a Nd—YAG laser.

The term "depth of engraving" as used herein means a distance between the position (height) of the engraved portion and the position (height) of the unengraved portion, when the flexographic printing plate was cross-sectionally observed. The depth of engraving was measured by observation with SEM (scanning electron microscope).

TABLE 3

Evaluation Results of Depth of Engraving

| | Metathesis Catalyst | Kind of Laser | Depth of Engraving (μm) |
|---|---|---|---|
| Example 16 | M-1 | $CO_2$ | 900 |
| Example 17 | M-2 | $CO_2$ | 900 |
| Example 18 | M-7 | $CO_2$ | 700 |
| Example 19 | M-8 | $CO_2$ | 700 |
| Example 20 | M-9 | $CO_2$ | 650 |
| Example 21 | M-1 | Nd-YAG | 630 |
| Example 22 | M-2 | Nd-YAG | 630 |
| Comparative Example 3 | None | $CO_2$ | 350 |
| Comparative Example 4 | None | Nd-YAG | 280 |

From the results shown in Table 3, it can be seen that the decomposable resin composition containing the metathesis catalyst according to the invention exhibits the large depth of engraving and can efficiently provide the excellent flexographic printing plate.

This application is based on Japanese Patent application JP 2006-99778, filed Mar. 31, 2006, the entire content of which is hereby incorporated by reference, the same as if set forth at length.

What is claimed is:

1. A laser engraving flexographic printing plate precursor comprising a support and a decomposable resin composition comprising a metathesis catalyst and a polymer compound having a carbon-carbon unsaturated bond in at least one of a main chain and a side chain of the polymer compound.

2. The laser engraving flexographic printing plate precursor as claimed in claim 1, which is laser-decomposable.

3. The laser engraving flexographic printing plate precursor as claimed in claim 1, further comprising a polymerizable compound.

4. The laser engraving flexographic printing plate precursor as claimed in claim 1, wherein an amount of the metathesis catalyst in the decomposable resin composition is from 0.0001 to 20% by weight based on an amount of the polymer compound contained in the decomposable resin composition.

5. The laser engraving flexographic printing plate precursor as claimed in claim 1, wherein a laser for engraving is a YAG laser, a fiber laser, a carbon dioxide gas laser or a semiconductor laser.

6. The laser engraving flexographic printing plate precursor as claimed in claim 1, wherein decomposition of the polymer compound is accelerated by a function of the metathesis catalyst.

* * * * *